(12) United States Patent
Nielsen et al.

(10) Patent No.: US 9,004,004 B2
(45) Date of Patent: **\*Apr. 14, 2015**

(54) OPTICAL SENSING METHODS AND APPARATUS FOR DETECTING A COLOR OF A MARKING SUBSTANCE

(71) Applicant: CertusView Technologies, LLC, Palm Beach Gardens, FL (US)

(72) Inventors: Steven Nielsen, North Palm Beach, FL (US); Jeffrey Farr, Royal Palm Beach, FL (US); Curtis Chambers, Palm Beach Gardens, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/867,521

(22) Filed: Apr. 22, 2013

(65) Prior Publication Data
US 2013/0233883 A1    Sep. 12, 2013

Related U.S. Application Data

(63) Continuation-in-part of application No. 12/429,947, filed on Apr. 24, 2009, now Pat. No. 8,424,486.

(60) Provisional application No. 61/079,518, filed on Jul. 10, 2008.

(51) Int. Cl.
*B05C 11/00* (2006.01)
*B67D 7/56* (2010.01)
(Continued)

(52) U.S. Cl.
CPC ............... *B05B 12/004* (2013.01); *B05C 11/00* (2013.01); *A63C 19/065* (2013.01); *B05B 12/081* (2013.01); *B05B 12/082* (2013.01);
(Continued)

(58) Field of Classification Search
None
See application file for complete search history.

(56) References Cited

U.S. PATENT DOCUMENTS 3,988,922 A    11/1976   Clark et al.
4,016,748 A     4/1977   Boyens
(Continued)

FOREIGN PATENT DOCUMENTS

CA    2636137    7/2007
CA    2623466    6/2011
(Continued)

OTHER PUBLICATIONS

U.S. Appl. No. 13/834,382, filed Mar. 15, 2013, Nielsen et al.
(Continued)

*Primary Examiner* — Dah-Wei D Yuan
*Assistant Examiner* — Jethro M Pence

(57) ABSTRACT

Marking devices for dispensing a marking substance on the ground and marking methods are provided. The marking devices and marking methods use one or more detection mechanisms to detect one or more characteristics of the marking substance. In some embodiments, the detection mechanism may be, but is not limited to, an optical sensor, an olfactory sensor, a weight sensor, a switch device, and any combination thereof. The one or more detection mechanisms may provide, for example, the capability to: (1) determine the type of marking substance that is installed in the marking device; (2) determine in advance of or during a marking operation the amount of marking substance within the marking dispenser; and (3) determine when the marking dispenser is becoming empty.

23 Claims, 9 Drawing Sheets

(51) Int. Cl.

| | | |
|---|---|---|
| B05D 1/02 | (2006.01) | |
| B05B 12/00 | (2006.01) | |
| A63C 19/06 | (2006.01) | |
| B05B 12/08 | (2006.01) | |
| B65D 83/20 | (2006.01) | |
| E01C 23/22 | (2006.01) | |
| G01G 17/06 | (2006.01) | |
| G01G 19/18 | (2006.01) | |
| G01G 23/37 | (2006.01) | |

(52) U.S. Cl.
CPC .......... *B65D83/203* (2013.01); *E01C 23/227* (2013.01); *G01G 17/06* (2013.01); *G01G 19/18* (2013.01); *G01G 23/3735* (2013.01); *A63C 2019/067* (2013.01)

(56) References Cited

U.S. PATENT DOCUMENTS

| | | | |
|---|---|---|---|
| 4,839,201 | A | 6/1989 | Rantanen |
| 4,873,533 | A | 10/1989 | Oike |
| 4,899,293 | A | 2/1990 | Dawson et al. |
| 5,065,098 | A | 11/1991 | Salsman et al. |
| 5,150,295 | A | 9/1992 | Mattingly |
| 5,164,607 | A | 11/1992 | Weigert |
| 5,214,757 | A | 5/1993 | Mauney et al. |
| 5,281,273 | A | 1/1994 | Emposimato |
| 5,329,464 | A | 7/1994 | Sumic et al. |
| 5,361,029 | A | 11/1994 | Rider |
| 5,379,045 | A | 1/1995 | Gilbert et al. |
| 5,389,149 | A | 2/1995 | Carey et al. |
| 5,467,271 | A | 11/1995 | Abel et al. |
| 5,486,067 | A | 1/1996 | Huynh |
| 5,517,419 | A | 5/1996 | Lanckton |
| 5,553,407 | A | 9/1996 | Stump |
| 5,576,973 | A | 11/1996 | Haddy |
| 5,644,237 | A | 7/1997 | Eslambolchi et al. |
| 5,659,985 | A | 8/1997 | Stump |
| 5,673,050 | A | 9/1997 | Moussally et al. |
| 5,704,142 | A | 1/1998 | Stump |
| 5,734,348 | A | 3/1998 | Aoki et al. |
| 5,751,450 | A | 5/1998 | Robinson |
| 5,819,859 | A | 10/1998 | Stump et al. |
| 5,918,565 | A | 7/1999 | Casas |
| 6,026,135 | A | 2/2000 | McFee et al. |
| 6,037,010 | A | 3/2000 | Kahmann et al. |
| 6,053,260 | A | 4/2000 | Boon |
| 6,064,940 | A | 5/2000 | Rodgers |
| 6,074,693 | A | 6/2000 | Manning |
| 6,075,481 | A | 6/2000 | Eslambolchi et al. |
| 6,095,081 | A | 8/2000 | Gochenour |
| 6,119,376 | A | 9/2000 | Stump |
| 6,127,827 | A | 10/2000 | Lewis |
| 6,138,906 | A | 10/2000 | DeMayo |
| 6,282,477 | B1 | 8/2001 | Gudat et al. |
| 6,292,108 | B1 | 9/2001 | Straser et al. |
| 6,294,022 | B1 | 9/2001 | Eslambolchi et al. |
| 6,299,934 | B1 | 10/2001 | Manning |
| 6,320,518 | B2 | 11/2001 | Saeki et al. |
| 6,343,290 | B1 | 1/2002 | Cossins |
| 6,388,629 | B1 | 5/2002 | Albats et al. |
| 6,390,336 | B1 | 5/2002 | Orozco |
| 6,401,051 | B1 | 6/2002 | Merriam |
| 6,411,094 | B1 | 6/2002 | Gard et al. |
| 6,417,797 | B1 | 7/2002 | Cousins et al. |
| 6,437,708 | B1 | 8/2002 | Brouwer |
| 6,438,239 | B1 | 8/2002 | Kuechen |
| 6,526,400 | B1 | 2/2003 | Takata |
| 6,564,154 | B1 | 5/2003 | Zimmerman et al. |
| 6,633,163 | B2 | 10/2003 | Fling |
| 6,658,148 | B1 | 12/2003 | Fung et al. |
| 6,700,526 | B2 | 3/2004 | Witten |
| 6,723,375 | B2 | 4/2004 | Zeck et al. |
| 6,751,553 | B2 | 6/2004 | Young |
| 6,769,462 | B2 | 8/2004 | Larson |
| 6,778,128 | B2 | 8/2004 | Tucker et al. |
| 6,815,953 | B1 | 11/2004 | Bigelow |
| 6,825,793 | B2 | 11/2004 | Taylor, Jr. et al. |
| 6,833,795 | B1 | 12/2004 | Johnson et al. |
| 6,850,161 | B1 | 2/2005 | Elliott et al. |
| 6,850,843 | B2 | 2/2005 | Smith et al. |
| 6,904,361 | B1 | 6/2005 | Tallman et al. |
| 6,915,955 | B2 | 7/2005 | Jung |
| 6,941,890 | B1 | 9/2005 | Cristo et al. |
| 6,947,028 | B2 | 9/2005 | Shkolnikov |
| 6,975,942 | B2 | 12/2005 | Young et al. |
| 6,999,021 | B2 | 2/2006 | Taylor, Jr. |
| 7,009,399 | B2 | 3/2006 | Olsson et al. |
| 7,038,454 | B2 | 5/2006 | Gard et al. |
| 7,110,142 | B2 | 9/2006 | Mestha |
| 7,120,564 | B2 | 10/2006 | Pacey |
| 7,142,196 | B1 | 11/2006 | Connor |
| 7,233,394 | B2 | 6/2007 | Odhner |
| 7,236,863 | B2 | 6/2007 | LaPorte et al. |
| 7,240,839 | B2 | 7/2007 | Jung |
| 7,298,483 | B2 | 11/2007 | Jung |
| 7,319,387 | B2 | 1/2008 | Willson et al. |
| 7,372,247 | B1 | 5/2008 | Giusti et al. |
| 7,400,976 | B2 | 7/2008 | Young et al. |
| 7,443,154 | B1 | 10/2008 | Merewether et al. |
| 7,447,509 | B2 | 11/2008 | Cossins |
| 7,451,721 | B1 | 11/2008 | Garza et al. |
| 7,469,247 | B2 | 12/2008 | Cossins et al. |
| 7,482,973 | B2 | 1/2009 | Tucker et al. |
| 7,498,816 | B1 | 3/2009 | Olsson et al. |
| 7,500,583 | B1 | 3/2009 | Cox |
| 7,636,901 | B2 | 12/2009 | Munson |
| 7,640,105 | B2 | 12/2009 | Nielsen et al. |
| 7,664,530 | B2 | 2/2010 | Skelton |
| 7,730,095 | B2 | 6/2010 | Vishwanath et al. |
| 7,733,077 | B1 | 6/2010 | Merewether et al. |
| 7,773,095 | B1 | 8/2010 | Badrak et al. |
| 7,834,801 | B2 | 11/2010 | Waite et al. |
| 7,834,806 | B2 | 11/2010 | Tucker et al. |
| 7,889,124 | B2 | 2/2011 | Islam et al. |
| 7,889,888 | B2 | 2/2011 | Deardorr |
| 7,929,981 | B2 | 4/2011 | Sangberg |
| 7,978,129 | B2 | 7/2011 | Sawyer et al. |
| 7,986,246 | B2 | 7/2011 | Angelis et al. |
| 8,060,304 | B2 | 11/2011 | Nielsen et al. |
| 8,068,789 | B2 | 11/2011 | Bell et al. |
| 8,069,412 | B2 | 11/2011 | Bankston et al. |
| 8,081,112 | B2 | 12/2011 | Tucker et al. |
| 8,106,660 | B1 | 1/2012 | Merewether et al. |
| 8,118,192 | B2 | 2/2012 | Daugherty |
| 8,144,245 | B2 | 3/2012 | Vik |
| 8,155,390 | B2 | 4/2012 | Nielsen et al. |
| 8,194,932 | B2 | 6/2012 | Nielsen et al. |
| 8,218,827 | B2 | 7/2012 | Nielsen et al. |
| 8,249,306 | B2 | 8/2012 | Nielsen et al. |
| 8,260,489 | B2 | 9/2012 | Nielsen et al. |
| 8,264,409 | B2 | 9/2012 | Miller |
| 8,265,344 | B2 | 9/2012 | Nielsen et al. |
| 8,270,666 | B2 | 9/2012 | Nielsen et al. |
| 8,280,117 | B2 | 10/2012 | Nielsen et al. |
| 8,280,631 | B2 | 10/2012 | Nielsen et al. |
| 8,280,969 | B2 | 10/2012 | Nielsen et al. |
| 8,290,204 | B2 | 10/2012 | Nielsen et al. |
| 8,290,215 | B2 | 10/2012 | Nielsen et al. |
| 8,296,308 | B2 | 10/2012 | Nielsen et al. |
| 8,300,895 | B2 | 10/2012 | Nielsen et al. |
| 8,301,380 | B2 | 10/2012 | Nielsen et al. |
| 8,340,359 | B2 | 12/2012 | Nielsen et al. |
| 8,355,542 | B2 | 1/2013 | Nielsen et al. |
| 8,356,255 | B2 | 1/2013 | Nielsen et al. |
| 8,361,543 | B2 | 1/2013 | Nielsen et al. |
| 8,374,789 | B2 | 2/2013 | Nielsen et al. |
| 8,384,742 | B2 | 2/2013 | Nielsen et al. |
| 8,386,178 | B2 | 2/2013 | Nielsen et al. |
| 8,401,791 | B2 | 3/2013 | Nielsen et al. |
| 8,407,001 | B2 | 3/2013 | Nielsen et al. |
| 8,416,995 | B2 | 4/2013 | Nielsen et al. |
| 8,424,486 | B2 | 4/2013 | Nielsen et al. |

(56) References Cited

U.S. PATENT DOCUMENTS

| | | |
|---|---|---|
| 8,473,148 B2 | 6/2013 | Nielsen et al. |
| 8,480,332 B2 | 7/2013 | Miller |
| 8,532,341 B2 | 9/2013 | Nielsen et al. |
| 8,543,937 B2 | 9/2013 | Nielsen et al. |
| 8,577,707 B2 | 11/2013 | Nielsen et al. |
| 8,589,201 B2 | 11/2013 | Nielsen et al. |
| 8,589,202 B2 | 11/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,630,463 B2 | 1/2014 | Nielsen et al. |
| 2002/0014415 A1 | 2/2002 | Nakayama |
| 2002/0035432 A1 | 3/2002 | Kubica et al. |
| 2002/0053608 A1 | 5/2002 | Zeck et al. |
| 2002/0103625 A1 | 8/2002 | Card et al. |
| 2002/0115472 A1 | 8/2002 | Andress |
| 2002/0122000 A1 | 9/2002 | Bradley et al. |
| 2002/0130906 A1 | 9/2002 | Miyaki |
| 2002/0155389 A1 | 10/2002 | Rangarajan |
| 2002/0184235 A1 | 12/2002 | Young |
| 2002/0190718 A1 | 12/2002 | Gard et al. |
| 2003/0012411 A1 | 1/2003 | Sjostrom |
| 2003/0058164 A1 | 3/2003 | Zhdanov et al. |
| 2003/0080897 A1 | 5/2003 | Tranchina |
| 2003/0083073 A1 | 5/2003 | Cossins |
| 2003/0100316 A1 | 5/2003 | Odamura |
| 2003/0135328 A1 | 7/2003 | Burns et al. |
| 2003/0168834 A1 | 9/2003 | Ulrich |
| 2003/0184300 A1 | 10/2003 | Bigelow |
| 2003/0196585 A1 | 10/2003 | McDonald et al. |
| 2004/0041892 A1 | 3/2004 | Yoneyama et al. |
| 2004/0051368 A1 | 3/2004 | Caputo |
| 2004/0057795 A1 | 3/2004 | Mayfield et al. |
| 2004/0070535 A1 | 4/2004 | Olsson et al. |
| 2004/0124988 A1 | 7/2004 | Leonard et al. |
| 2004/0168358 A1 | 9/2004 | Stump |
| 2004/0210370 A1 | 10/2004 | Gudat |
| 2004/0220731 A1 | 11/2004 | Tucker |
| 2004/0225444 A1 | 11/2004 | Young et al. |
| 2004/0260720 A1 | 12/2004 | Cossins |
| 2005/0004944 A1 | 1/2005 | Cossins |
| 2005/0023367 A1 | 2/2005 | Reighard |
| 2005/0038825 A1 | 2/2005 | Tarabzouni |
| 2005/0156600 A1* | 7/2005 | Olsson et al. ................. 324/329 |
| 2005/0206562 A1 | 9/2005 | Willson et al. |
| 2005/0232475 A1 | 10/2005 | Floeder |
| 2006/0026020 A1 | 2/2006 | Waite et al. |
| 2006/0055584 A1 | 3/2006 | Waite et al. |
| 2006/0077095 A1 | 4/2006 | Tucker et al. |
| 2006/0085133 A1 | 4/2006 | Young |
| 2006/0220955 A1 | 10/2006 | Hamilton |
| 2006/0244454 A1 | 11/2006 | Gard |
| 2006/0262963 A1 | 11/2006 | Navulur |
| 2006/0276985 A1 | 12/2006 | Xu |
| 2006/0282280 A1 | 12/2006 | Stotz et al. |
| 2007/0031042 A1 | 2/2007 | Simental |
| 2007/0040558 A1 | 2/2007 | Overby et al. |
| 2007/0100496 A1 | 5/2007 | Forell |
| 2007/0219722 A1 | 9/2007 | Sawyer, Jr. |
| 2007/0223803 A1 | 9/2007 | Shindo |
| 2007/0268110 A1 | 11/2007 | Litte |
| 2007/0286021 A1 | 12/2007 | Hoenmans et al. |
| 2008/0010009 A1 | 1/2008 | Miyoshi |
| 2008/0013940 A1 | 1/2008 | Jung |
| 2008/0021863 A1 | 1/2008 | Evans |
| 2008/0125942 A1 | 5/2008 | Tucker et al. |
| 2008/0180322 A1 | 7/2008 | Islam |
| 2008/0204322 A1 | 8/2008 | Oswald et al. |
| 2008/0208415 A1 | 8/2008 | Vik |
| 2008/0245299 A1* | 10/2008 | Nielsen et al. ................. 118/712 |
| 2008/0255795 A1 | 10/2008 | Shkolnikov |
| 2008/0310721 A1 | 12/2008 | Yang |
| 2009/0004410 A1 | 1/2009 | Thomson et al. |
| 2009/0055719 A1 | 2/2009 | Cossins |
| 2009/0089015 A1 | 4/2009 | Bell et al. |
| 2009/0109081 A1 | 4/2009 | Ryerson |
| 2009/0121933 A1 | 5/2009 | Tucker et al. |
| 2009/0171616 A1 | 7/2009 | Zhang et al. |
| 2009/0185858 A1 | 7/2009 | Malit |
| 2009/0201311 A1 | 8/2009 | Nielsen et al. |
| 2009/0202101 A1 | 8/2009 | Nielsen et al. |
| 2009/0204238 A1 | 8/2009 | Nielsen et al. |
| 2009/0204466 A1 | 8/2009 | Nielsen et al. |
| 2009/0204625 A1 | 8/2009 | Chambers et al. |
| 2009/0207019 A1 | 8/2009 | Nielsen et al. |
| 2009/0208642 A1 | 8/2009 | Nielsen et al. |
| 2009/0210098 A1 | 8/2009 | Nielsen et al. |
| 2009/0210245 A1 | 8/2009 | Wold |
| 2009/0210284 A1 | 8/2009 | Nielsen et al. |
| 2009/0210285 A1 | 8/2009 | Nielsen et al. |
| 2009/0210298 A1 | 8/2009 | Nielsen et al. |
| 2009/0238415 A1 | 9/2009 | Nielsen et al. |
| 2009/0324815 A1 | 12/2009 | Nielsen et al. |
| 2009/0327024 A1 | 12/2009 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0070347 A1 | 3/2010 | Chen |
| 2010/0084532 A1 | 4/2010 | Nielsen et al. |
| 2010/0085694 A1 | 4/2010 | Nielsen et al. |
| 2010/0085701 A1 | 4/2010 | Nielsen et al. |
| 2010/0086671 A1 | 4/2010 | Nielsen et al. |
| 2010/0088031 A1 | 4/2010 | Nielsen et al. |
| 2010/0088032 A1 | 4/2010 | Nielsen et al. |
| 2010/0088134 A1 | 4/2010 | Nielsen et al. |
| 2010/0088135 A1 | 4/2010 | Nielsen et al. |
| 2010/0088164 A1 | 4/2010 | Nielsen et al. |
| 2010/0090700 A1 | 4/2010 | Nielsen et al. |
| 2010/0097224 A1 | 4/2010 | Prodanovich |
| 2010/0117654 A1 | 5/2010 | Nielsen et al. |
| 2010/0131903 A1 | 5/2010 | Thomson et al. |
| 2010/0146454 A1 | 6/2010 | Sugahara |
| 2010/0161359 A1 | 6/2010 | Asher |
| 2010/0188088 A1 | 7/2010 | Nielsen et al. |
| 2010/0188215 A1 | 7/2010 | Nielsen et al. |
| 2010/0188216 A1 | 7/2010 | Nielsen et al. |
| 2010/0188245 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0205264 A1 | 8/2010 | Nielsen et al. |
| 2010/0205536 A1 | 8/2010 | Nielsen et al. |
| 2010/0205554 A1 | 8/2010 | Nielsen et al. |
| 2010/0207816 A1 | 8/2010 | Islam et al. |
| 2010/0211354 A1 | 8/2010 | Park et al. |
| 2010/0228588 A1 | 9/2010 | Nielsen et al. |
| 2010/0245086 A1 | 9/2010 | Nielsen et al. |
| 2010/0247754 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0255182 A1 | 10/2010 | Nielsen et al. |
| 2010/0256825 A1 | 10/2010 | Nielsen et al. |
| 2010/0256912 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0259381 A1 | 10/2010 | Nielsen et al. |
| 2010/0259414 A1 | 10/2010 | Nielsen et al. |
| 2010/0262470 A1 | 10/2010 | Nielsen et al. |
| 2010/0262670 A1 | 10/2010 | Nielsen et al. |
| 2010/0263591 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |

(56) References Cited

U.S. PATENT DOCUMENTS

| | | |
|---|---|---|
| 2010/0324967 A1 | 12/2010 | Nielsen et al. |
| 2011/0007076 A1 | 1/2011 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0046999 A1 | 2/2011 | Nielsen et al. |
| 2011/0060496 A1 | 3/2011 | Nielsen et al. |
| 2011/0060549 A1 | 3/2011 | Nielsen et al. |
| 2011/0095885 A9 | 4/2011 | Nielsen et al. |
| 2011/0131081 A1 | 6/2011 | Nielsen et al. |
| 2011/0137769 A1 | 6/2011 | Nielsen et al. |
| 2011/0236588 A1 | 9/2011 | Nielsen et al. |
| 2011/0279229 A1 | 11/2011 | Nielsen et al. |
| 2011/0279230 A1 | 11/2011 | Nielsen et al. |
| 2011/0279476 A1 | 11/2011 | Nielsen et al. |
| 2011/0283217 A1 | 11/2011 | Nielsen et al. |
| 2011/0285749 A1 | 11/2011 | Nielsen et al. |
| 2012/0019380 A1 | 1/2012 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0066506 A1 | 3/2012 | Nielsen et al. |
| 2012/0069178 A1 | 3/2012 | Nielsen et al. |
| 2012/0072035 A1 | 3/2012 | Nielsen et al. |
| 2012/0110019 A1 | 5/2012 | Nielsen et al. |
| 2012/0113244 A1 | 5/2012 | Nielsen et al. |
| 2013/0044918 A1 | 2/2013 | Nielsen et al. |
| 2013/0085670 A1 | 4/2013 | Nielsen et al. |
| 2013/0103318 A1 | 4/2013 | Nielsen et al. |
| 2013/0135343 A1 | 5/2013 | Nielsen et al. |
| 2013/0147637 A1 | 6/2013 | Nielsen et al. |
| 2013/0174072 A9 | 7/2013 | Nielsen et al. |
| 2013/0186333 A1 | 7/2013 | Nielsen et al. |
| 2013/0194303 A1 | 8/2013 | Nielsen et al. |
| 2013/0231984 A1 | 9/2013 | Nielsen et al. |
| 2013/0251894 A1 | 9/2013 | Nielsen et al. |
| 2013/0265138 A1 | 10/2013 | Nielsen et al. |
| 2013/0268199 A1 | 10/2013 | Nielsen et al. |
| 2013/0287500 A1 | 10/2013 | Miller |
| 2013/0315449 A1 | 11/2013 | Nielsen et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |

FOREIGN PATENT DOCUMENTS

| | | |
|---|---|---|
| CH | 695087 A5 | 12/2005 |
| EP | 1974638 | 10/2008 |
| JP | 8050180 | 2/1996 |
| WO | WO9516827 | 6/1995 |
| WO | WO0194016 | 12/2001 |
| WO | WO0228541 | 4/2002 |
| WO | WO2008112461 | 9/2008 |

OTHER PUBLICATIONS

U.S. Appl. No. 13/846,120, filed Mar. 18, 2013, Nielsen et al.
U.S. Appl. No. 13/797,229, filed Mar. 12, 2013, Nielsen et al.
U.S. Appl. No. 13/795,337, filed Mar. 12, 2013, Nielsen et al.
U.S. Appl. No. 13/751,862, filed Jan. 28, 2013, Nielsen et al.
Bernold, L.. et al. "Equipment operator training in the age of internet2," Proceedings of 19th International Symposium on Automation and Robotics in Construction (ISARC 2002), Sep. 2002 [retrieved on Nov. 12, 2010]. Retrieved from the Internet: <URL:http://fire.nist.gov/bfrlpubsibuild02lPDF/b02059.pdf>. p4, col. 2, para 2.
Corrected Notice of Allowability dated May 10, 2013 from U.S. Appl. No. 12/797,227.
Corrected Notice of Allowability from U.S. Appl. No. 12/364,369 dated Apr. 15, 2013.
Corrected Notice of Allowability from U.S. Appl. No. 12/703,958 dated Apr. 18, 2013.
New Mexico's Recommended Marking Guidelines for Underground Utilities, May 2006, 8 pages.
Notice of Allowance dated Apr. 25, 2013 from U.S. Appl. No. 12/364,359.
Notice of Allowance dated May 10, 2013 from U.S. Appl. No. 12/797,243.
Office Action dated Mar. 13, 2013 from Chinese Application No. 201080045879.1.
Office Action dated Apr. 26, 2013 from U.S. Appl. No. 12/859,394.
Office Action dated May 10, 2013 from U.S. Appl. No. 12/786,929.
Office Action dated May 24, 2012 from U.S. Appl. No. 12/429,947.
Product Data, Hard Hat Aerosols Marking Paint 2300; Rust-oleum Netherlands B.V., Apr. 2005, 1 page, http://www.rustoleum.co.uk/downloads/2300%20Marking%20Spray.pdf.
Product Data, "Inverted Marking Chalk," Rust-oleum, Jul. 2004, 2 pages, http://www.policeone.com/pdfs/markingchalkinfo_ro.pdf.
Virginia Underground utility marking standard, Mar. 2004, 20 pages.
Office Action dated Dec. 28, 2012 from U.S. Appl. No. 12/364,359.
Nielsen et al., co-pending U.S. Patent No. 8,424,486, issued Apr. 23, 2013.
Corrected Notice of Allowability dated May 13, 2013 from U.S. Appl. No. 12/429,929.
Corrected Notice of Allowability dated May 14, 2013 from U.S. Appl. No. 12/797,202.
Combined Search and Examination Report dated Oct. 24, 2013 from GB Application No. 1312313.8.
Complaint for Patent Infringement dated Apr. 10, 2013, *CertusView Technologies LLC* v. *United States Infrastructure Corporation et al.*, Case No. 2:13CV182, USDC Eastern District of Virginia.
Complaint for Patent Infringement dated May 28, 2013, *CertusView Technologies LLC* v. *S&N Locating Services, LLC et al.*, Case No. 1:13CV646, USDC Eastern District of Virginia.
Corrected Notice of Allowability dated Nov. 22, 2013 from U.S. Appl. No. 12/797,211.
Decision of Final Rejection dated Apr. 24, 2013 from Japanese Application No. 2010-502170.
European Search Report and Opinion dated Nov. 28, 2013 from EP Application No. 10808689.3.
European Search Report dated Sep. 25, 2013 from European Application No. 13177282.4.
Examination Reported dated Sep. 4, 2013 from GB Application No. GB1107165.1.
Notice of Allowability dated Jul. 5, 2013 from U.S. Appl. No. 12/701,447.
Notice of Allowability dated Jul. 10, 2013 from U.S. Appl. No. 13/795,337.
Notice of Allowance dated Jun. 17, 2013 from Canadian Application No. 2,750,908.
Notice of Allowance dated Jul. 10, 2013 from U.S. Appl. No. 12/571,411.
Notice of Allowance dated Aug. 1, 2013 from U.S. Appl. No. 12/571,401.
Notice of Allowance dated Aug. 2, 2013 from U.S. Appl. No. 12/797,211.
Notice of Allowance dated Aug. 27, 2013 from U.S. Appl. No. 12/855,977.
Notice of Allowance dated Sep. 17, 2013 from U.S. Appl. No. 12/859,394.
Notice of Allowance dated Sep. 25, 2013 from U.S. Appl. No. 12/364,369.

(56) References Cited

OTHER PUBLICATIONS

Notice of Allowance dated Sep. 25, 2013 from U.S. Appl. No. 12/571,408.
Notice of Allowance dated Jan. 14, 2014 from U.S. Appl. No. 12/797,169.
Office Action dated Jan. 9, 2014 from Canadian Application No. 2,738,968.
Office Action dated Jun. 17, 2013 from U.S. Appl. No. 12/797,262.
Office Action dated Aug. 7, 2013 from Canadian Application No. 2,739,119.
Office Action dated Aug. 7, 2013 from Canadian Application No. 2,739,320.
Office Action dated Sep. 25, 2013 from U.S. Appl. No. 13/686,262.
Office Action dated Nov. 5, 2013 from U.S. Appl. No. 12/979,262.
Office Action dated Dec. 30, 2013 from U.S. Appl. No. 13/834,382.
Patent Examination Report No. 1 dated Jan. 24, 2014 from Australian Application No. 2012227240.
Supplemental Notice of Allowability dated Aug. 1, 2013 from U.S. Appl. No. 12/571,411.
Supplementary European Search Report dated Nov. 7, 2013 from EP Application No. 10810421.7.
U.S. Appl. No. 14/170,740, filed Feb. 3, 2014, Nielsen et al.
U.S. Appl. No. 14/281,033, filed May 19, 2014, Nielsen et al.
Corrected Notice of Allowability dated Sep. 17, 2014 from U.S. Appl. No. 13/834,382.
Corrected Notice of Allowability dated Oct. 10, 2014 from U.S. Appl. No. 13/834,382.
Corrected Notice of Allowabilitiy dated Nov. 4, 2014 from U.S. Appl. No. 12/834,382.
Examination Report dated May 28, 2014 for European Application No. 13177282.4.
Notice of Allowance dated Feb. 26, 2014 from U.S. Appl. No. 13/686,262.
Notice of Allowance dated May 20, 2014 from U.S. Appl. No. 12/363,951.
Notice of Allowance dated Jul. 17, 2014 from U.S. Appl. No. 13/644,226.
Notice of Allowance dated Jul. 23, 2014 from U.S. Appl. No. 13/834,382.
Notice of Allowance dated Sep. 12, 2014 from U.S. Appl. No. 13/644,226.
Notice of Allowance dated Oct. 16, 2014 from U.S. Appl. No. 12/568,087.
Notice of Allowance dated Nov. 7, 2014 from U.S. Appl. No. 13/846,120.
Office Action dated Mar. 25, 2014 from Canadian Application No. 2,771,286.
Office Action dated Jun. 10, 2014 from U.S. Appl. No. 12/701,468.
Office Action dated Jun. 26, 2014 from U.S. Appl. No. 12/701,496.
Office Action dated Jul. 8, 2014 from U.S. Appl. No. 12/568,087.
Office Action dated Jul. 10, 2014 from U.S. Appl. No. 12/786,929.
Office Action dated Jul. 25, 2014 from Taiwan Patent Application No. 097108911.
Office Action dated Jul. 29, 2014 from U.S. Appl. No. 13/846,120.
Office Action dated Aug. 12, 2014 from Japanese Patent Application No. 2013-185570.
Office Action dated Aug. 21, 2014 from Taiwan Application No. 097108912.
Office Action dated Sep. 24, 2014 from U.S. Appl. No. 12/701,468.
Office Action dated Oct. 6, 2014 from U.S. Appl. No. 12/701,496.
Patent Examination Report dated Aug. 13, 2014 from Australian Application No. 20100282559.
Patent Examination Report dated Sep. 8, 2014 from Australian Application No. 2013200160.
Supplemental Notice of Allowability dated Jul. 21, 2014 from U.S. Appl. No. 12/363,951.
Office Action dated Oct. 17, 2014 from Canadian Application No. 2,822,869.
Office Action dated Dec. 2, 2014 from Japanese Application No. 2013-212885.
Office Action dated Dec. 5, 2014 from U.S. Appl. No. 12/786,929.
Supplemental Notice of Allowability dated Nov. 4, 2014 from U.S. Appl. No. 13/644,226.

\* cited by examiner

OPTICAL SENSING METHODS AND APPARATUS FOR DETECTING A COLOR OF A MARKING SUBSTANCE

CROSS REFERENCE TO RELATED APPLICATION

This application claims benefit, under 35 U.S.C. §120, as a continuation (CON) of U.S. Non-provisional application Ser. No. 12/429,947, entitled "Marker Detection Mechanisms for Use in Marking Devices and Methods of Using Same" filed Apr. 24, 2009.

Application Ser. No. 12/429,947 in turn claims the benefit, under 35 U.S.C. §119(e), of U.S. Provisional Application Ser. No. 61/079,518, entitled "Paint Detection Mechanisms for Use in Marking Devices and Methods of Making Same," filed Jul. 10, 2008.

Each of the above-referenced applications is hereby incorporated by reference in its entirety.

FIELD OF THE INVENTION

The present invention relates generally to the field of marking devices for placing marks on the ground. In particular, the present invention relates to marker detection mechanisms for use in marking devices and methods of using same.

BACKGROUND

Marking paint, such as inverted marking spray paint (also known as "upside down paint"), may be used by land surveyors, underground facility locate technicians, or anyone that has a need to mark a location on the ground. Marking paint may be dispensed onto the ground using marking devices, such as paint marking wands, applicators, and/or wheels.

In many marking applications, a specified marking paint color may be required for identifying a particular facility or entity. For example, once located, an underground power line may be marked with one color, an underground telephone line may be marked with another color, an underground gas line may be marked with yet another color, and so on. Paint durability and/or ease of removal of the marking paint may also be important. These marking paint characteristics may vary depending on the surface on which the marking paint is applied (e.g., pavement, grass, gravel, and so on). Consequently, marking paint may be formulated to vary in accordance with durability and/or ease of removal specifications for different surfaces and uses. For example, municipalities may require that marking paint on streets and sidewalks fade away within a specified period of time. Therefore, it may be beneficial to develop mechanisms for ensuring, for example, that the proper color and/or formulation of marking paint is being used and/or has been used.

In addition, certain inefficiencies may exist in marking applications when the user of the marking device is unaware of the amount of marking paint contained within a paint dispenser. For example, if a large marking operation is begun with a partially filled paint dispenser, the paint dispenser may become empty before the marking operation is complete. Consequently, the marking operation may be interrupted while the user retrieves another full paint dispenser to replace the empty paint dispenser and resumes the marking operation. Therefore, it may be beneficial to develop ways for the user and/or remote supervisor to know and record the type and amount of marking paint present in the marking device, the corresponding paint marking distance and/or when the paint dispenser is becoming empty.

Accordingly, approaches are needed for automatically determining the characteristics, such as color and durability, of marking paint used in a marking operation, such as an underground facility locate operation; for monitoring the amount of marking paint present in the marking dispenser and/or for determining when the marking dispenser is becoming empty.

SUMMARY OF THE INVENTION

According to a first aspect of the invention, a marking apparatus is provided to mark the presence or absence of an underground facility in a dig area. The marking apparatus comprises: a housing configured to enable dispensing of a marking substance onto the ground for marking the presence or absence of an underground facility in a dig area; a marking dispenser holder affixed to the housing to hold at least one marking dispenser; an actuator to cause dispensing of the marking substance from the marking dispenser onto the ground in the dig area, in a marking operation, to mark the presence or absence of an underground facility; at least one marking substance detection mechanism to detect one or more characteristics of the marking substance dispensed from the marking dispenser and to provide detector information representative of the one or more characteristics; and a processing device to generate output information in response to the detector information, the output information representing the one or more characteristics of the marking substance.

According to a second aspect of the invention, a method is provided for performing a marking operation for marking the presence or absence of an underground facility in a dig area using a marking apparatus that holds at least one marking dispenser. The method comprises: dispensing a marking substance from the marking dispenser onto the ground in the dig area, in a marking operation, to mark the presence or absence of an underground facility, in response to activation of the marking dispenser; detecting one or more characteristics of the marking substance dispensed from the marking dispenser and providing detector information representative of the one or more characteristics; and generating output information in response to the detector information, the output information representing the one or more characteristics of the marking substance.

BRIEF DESCRIPTION OF THE DRAWINGS

For the purpose of illustrating the present invention, the drawings show aspects of one or more embodiments of the present invention. However, it should be understood that the present invention is not limited to the precise arrangements and instrumentalities shown in the drawings, wherein.

DETAILED DESCRIPTION

The invention relates to marking devices for dispensing a marking substance on the ground and to marking methods. The marking devices and marking methods use one or more detection mechanisms to detect one or more characteristics of the marking substance. In some embodiments of the invention, the detection mechanism may be, but is not limited to, an optical sensor, an olfactory sensor, a weight sensor, a switch device, and any combinations thereof. The one or more detection mechanisms may provide, for example, the capability to: (1) determine the type of marking substance that is installed in the marking device; (2) determine in advance of or during a marking operation the amount of marking substance within the marking dispenser; and (3) determine when the marking dispenser is becoming empty.

Figure 1:
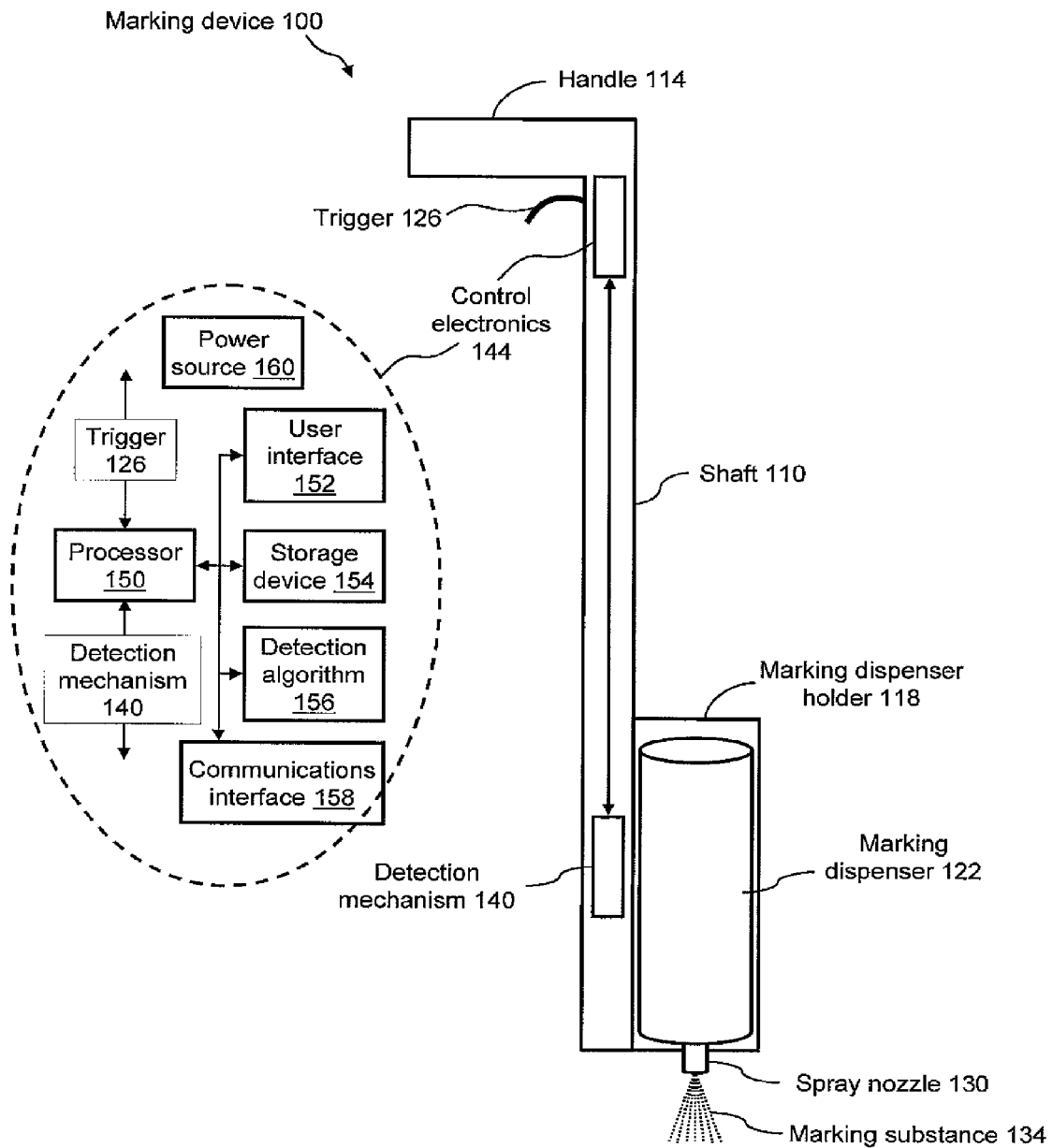
FIG. 1 is a schematic diagram of a marking device that includes a detection mechanism, and a block diagram of the control electronics of the marking device.

FIG. 1 is a schematic diagram of a marking device 100 that includes at least one detection mechanism. The marking device 100 is also referred to herein as a "marking apparatus." FIG. 1 also shows a block diagram of the control electronics of marking device 100. In particular, marking device 100 may include a detection mechanism for detecting the type of marking substance, detecting the amount of marking substance in the marking dispenser, and/or detecting when the marking dispenser is becoming empty.

Marking device 100 may include a shaft 110, a handle 114 at one end of shaft 110, and a marking dispenser holder 118 for holding a marking dispenser 122 at the end of shaft 110 that is opposite handle 114. Additionally, marking device 100 may include a trigger 126 for actuating a spray nozzle 130 of marking dispenser 122 to dispense a marking substance 134 onto the target of a marking operation, such as the ground. Marking dispenser 122 may be an aerosol canister that contains a quantity of a marking substance 134. Marking substance 134 may be, for example, marking paint, marking chalk, marking dye, marking powder, and the like. In one example, marking dispenser 122 may be an aerosol canister that contains marking paint, such as commercially available marking paint. Marking device 100 may be configured to hold a single marking dispenser or more than one marking dispenser.

A basic marking operation of marking device 100 may be described as follows. A user, such as a locate technician in, for example, an underground facility locate application, loads a marking dispenser 122 that contains a quantity of marking substance 134 into marking dispenser holder 118. The user grasps handle 114 of marking device 100 and aims nozzle 130 of marking dispenser 122 at the intended target. The user then pulls trigger 126, which may be mechanically coupled to spray nozzle 130 of marking dispenser 122, in order to dispense marking substance 134 in a specified pattern on the intended target, such as the ground. For example, marking device 100 may be used to mark lines, arrows, geometric shapes, numbers, letters, words, and any combinations thereof on the ground.

Marking device 100 further includes at least one marking substance detection mechanism 140 and control electronics 144, as described below. In some embodiments, marking device 100 is configured for mounting a single marking dispenser and includes at least one detection mechanism. In other embodiments, marking device 100 is configured for mounting one or more marking dispensers and includes one or more detection mechanisms for each marking dispenser. In further embodiments, marking device 100 includes two or more detection mechanisms of the same or different types.

Marking substance detection mechanism 140 may include any sensor or device that provides information about a characteristic of marking substance 134, such as color or formulation, durability and/or amount of the marking substance 134 in marking dispenser 122. For example, detection mechanism 140 may include, but is not limited to, optical sensing devices, weight sensing devices, olfactory sensing devices, switching devices, other mechanical/electrical components, and any combinations thereof. The location of the detection mechanism 140 relative to marking dispenser 122 may vary depending on the type or function of the sensing device. The detection of marking substance 134 may be direct, as in the case of an optical sensor, or may be indirect, as in the case of a weight sensor that senses the weight of marking dispenser 122 and marking substance 134. Non-limiting examples of detection mechanism 140 are described in more detail with reference to FIGS. 2 through 9.

Control electronics 144 is provided for, among other purposes, communicating with and processing information from detection mechanism 140. Control electronics 144 may include a processor 150, a user interface 152, a storage device 154, a detection algorithm 156, a communications interface 158, and a power source 160. Detection algorithm 156 may be implemented as a software module executed by processor 150 and stored in storage device 154, or as a separate coprocessor controlled by processor 150. Power source 160 of control electronics 144 may be, for example, one or more rechargeable or non-rechargeable batteries.

Processor 150 may be any general purpose or special purpose processor, controller, microcontroller, or digital signal processor (DSP) device for managing the overall control of marking device 100. Processor 150 may be a programmable processor that is capable of executing program instructions of, for example, detection algorithm 156. Additionally, processor 150 manages the communication between trigger 126, detection mechanism 140, user interface 152, storage device 154, and detection algorithm 156.

User interface 152 may be, for example, any visual and/or audible device that may be used in order to provide feedback (depending on the type and function of detection mechanism 140) to the user of the marking device 100. For example, user interface 152 may include visual devices, such as one or more light-emitting diode (LED) devices and/or a display device, and one or more audible devices, such as a buzzer, a beeper, a speaker, and the like. User interface 152 may also include one or more input devices, such as a touch screen or a keypad, to receive user inputs.

In one example, selected information, including but not limited to detected information from detection mechanism 140 and/or information generated by detection algorithm 156, may be stored locally in storage device 154. Non-limiting examples of information that may be stored in storage device 154 are described in more detail with reference to FIGS. 2 through 9. Storage device 154 may be any volatile or non-volatile data storage device, such as, but not limited to, a random access memory (RAM) device and a removable memory device (e.g., a USB flash drive). Optionally, storage device 154 is not included in control electronics 144. Instead, embedded memory (not shown) within processor 150 may be used for caching information during the operation of marking device 100.

Detection algorithm 156 may process and interpret information received from detection mechanism 140 and then issue a response, if necessary. The functions of detection algorithm 156 may vary depending on the type and function of detection mechanism 140. For example, detection algorithm 156 may process and interpret optical sensor information, weight sensor information, olfactory sensor information, switch information, and any combinations thereof. The general operations of detection algorithm 156 may include, but are not limited to: (1) reading reference detection information; (2) reading measured detection information from detection mechanism 140; (3) comparing the measured detection information from detection mechanism 140 with the reference detection information; (4) determining whether there is a match between the measured detection information from detection mechanism 140 and the reference detection information; and (5) generating output information that is based on the comparison and/or specified rules. Non-limiting examples of the operation of detection algorithm 156 in combination with detection mechanism 140 are described in more detail with reference to FIGS. 2 through 9.

Communications interface 158 may be any wired and/or wireless interface by which data is transmitted from marking device 100 to an external or remote device, such as a remote computing device. The remote computing device may be, for example, a computer in the user's vehicle and/or a server at a central location. Examples of wired interfaces may include, but are not limited to, universal serial bus (USB) ports, RS232 connectors, RJ45 connectors, and any combinations thereof. Examples of wireless interfaces may include, but are not limited to, Bluetooth® technology and IEEE 802.11 technology. Information received from detection mechanism 140 may be transmitted in real time or non-real time from marking device 100 via communications interface 158 with or without being stored locally in storage device 154 and with or without being processed.

In one example, detection mechanism 140 and control electronics 144 may be integrated into any commercially available marking device to form marking device 100. Alternatively, detection mechanism 140 and control electronics 144 may be integrated into the marking systems that are described in U.S. patent application Ser. No. 11/696,606, filed Apr. 4, 2007 and published Oct. 9, 2008 as Publication No. 2008/0245299, entitled "Marking system and method"; and U.S. patent application Ser. No. 11/685,602, filed Mar. 13, 2007 and published Sep. 19, 2008 as Publication No. 2008/0228294, entitled "Marking system and method with location and/or time tracking," both of which are incorporated by reference herein in their entirety.

Figure 2:
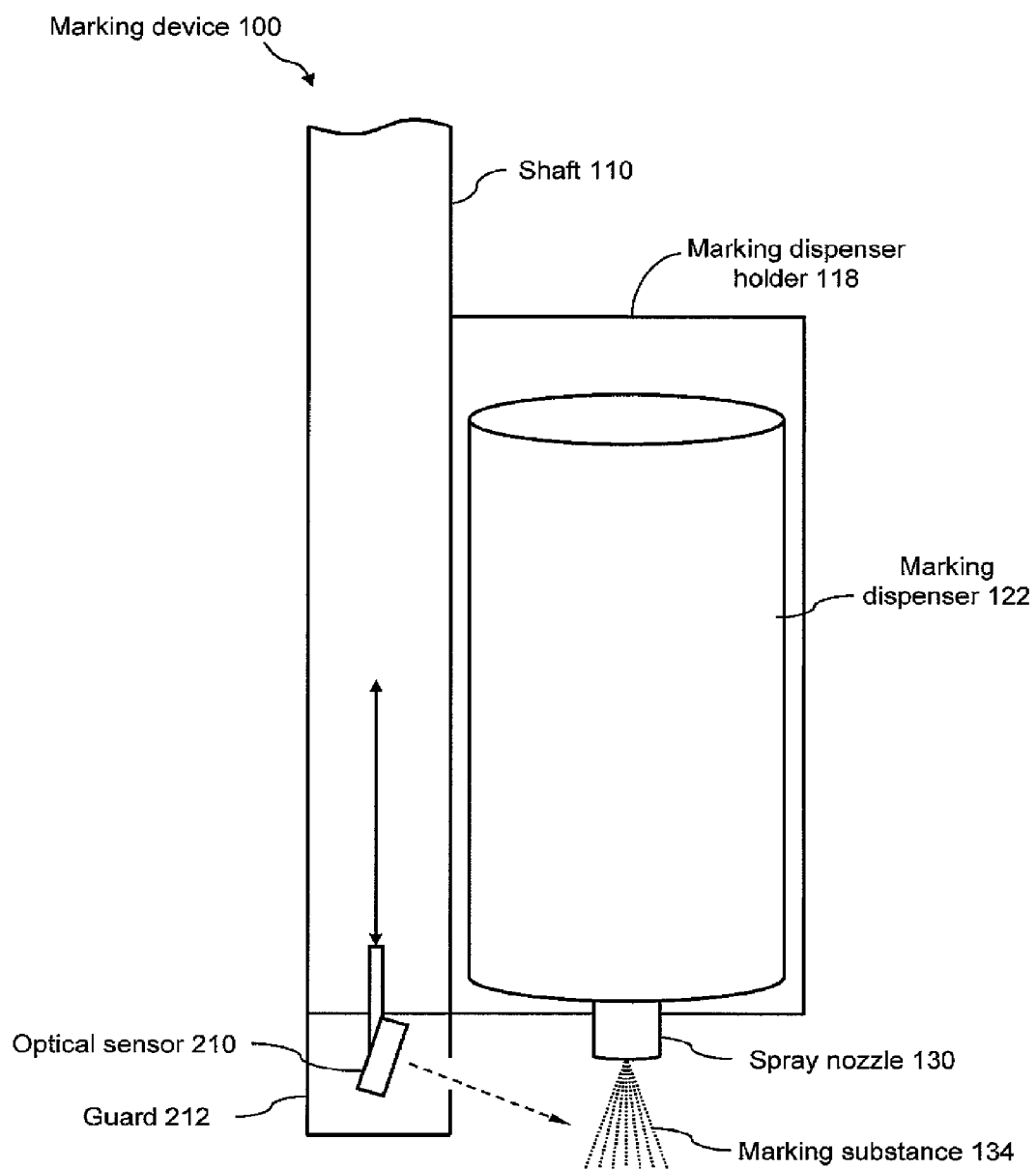
FIG. 2 is a schematic diagram of a marking device that includes an optical sensor.

FIG. 2 is a schematic diagram of the lower end of marking device 100, including a detection mechanism in the form of an optical sensor 210. Optical sensor 210 is mounted near marking dispenser holder 118 such that there is a "line of sight" between optical sensor 210 and marking substance 134 as it is dispensed from spray nozzle 130 of marking dispenser 122. An overspray guard 212 may be utilized to limit buildup of marking substance 134 on the optical window of optical sensor 210.

In one example, optical sensor 210 may be a spectrometer (or reflectance spectrometer) device, which is an optical instrument that is used to measure properties of light over a specific portion of the electromagnetic spectrum. Spectrometers are typically used to perform spectroscopic analysis to identify materials. In a marking application that uses marking device 100, the spectrometer (e.g., optical sensor 210) is used to perform spectroscopic analysis to identify marking substance 134, which may be one of a variety of colors and formulations of marking substance 134. Commercially available low power, compact spectrometer devices may be suitable for use as optical sensor 210 of marking device 100. The output signal from optical sensor 210 depends on the type of optical sensor used and may be a digital or analog signal. When the optical sensor 210 is a spectrometer, the output signal from optical sensor 210 represents the spectrum of marking substance 134. The output signal of optical sensor 210 may be utilized directly to determine the characteristics of the marking substance or may be preprocessed by processor 150 to simplify analysis. For example, processor 150 may convert the measured spectral information to a numerical value for comparison with the values in Table 1 below.

Optionally, a light source (not shown) may be utilized in combination with optical sensor 210 to provide a consistent light intensity within the field of view of optical sensor 210. The light source may be any light source, such as, but not limited to, a white or colored light source, a laser source, an ultraviolet (UV) light source, and the like. Optionally, unique optical markers may be added to the chemical formulations of compositions and/or types of marking substances 134 in order to provide a unique detectable spectrum for the different compositions and/or types of marking substances 134. In one example, a black light may be used in combination with optical sensor 210 to detect UV markers that have been added to the chemical formulations of marking substances 134.

In this embodiment, the spectral signature of each of the possible colors, types, durabilities, manufacturers, and the like of marking substances 134 are predetermined and stored, for example, in storage device 154. In a learning mode, the optical sensor 210 may be used to measure the spectrum information of each composition and/or type of marking substance 134 of interest. The spectrum measurements of the different compositions and/or types of marking substances 134 may be stored in order to provide a set of reference spectral signatures for later comparison with measured spectral signatures. Then, the same optical sensor 210 is used to measure the spectral signatures of marking substances dispensed by the marking device. In this approach, the effect of differences among optical sensors 210 is eliminated. In another approach, spectral signatures are measured by a reference optical sensor to provide reference spectral signatures, and the reference spectral signatures are provided, such as by downloading, to one or more marking devices. The measured spectral signature of marking substance 134 is compared to the reference spectral signatures to identify the marking substance 134 being dispensed.

The marking device 100 may detect, among other characteristics, the durability of marking substance 134. Such durability may be evaluated by comparison with known criterion pertaining to location and environment of the intended use of marking device 100. In the event that the durability of marking substance 134 is found to be inappropriate for the known criterion, a notification is generated for the user to replace marking dispenser 122. In other embodiments, such notification may be sent to supervisory and other appropriate personnel through communication media such as e-mail, SMS, RSS, internet/intranet dashboards, and the like.

Table 1 below shows an example of reference spectral signature information that may be stored in storage device 154. The information correlates specified marking substances 134 to predetermined spectral signatures.

TABLE 1

Marking Substance vs. Expected Spectral Signature

| Brand | Color | Durability | Approved Marking Use | Optical Sensor Reading | Spectral Signature |
|---|---|---|---|---|---|
| None | Clear | N/A | N/A | 0.0 | 0000 |
| Brand #1 | Yellow | High | Gas | 2.0 | 0001 |
| Brand #2 | Yellow | High | Gas | 4.0 | 0002 |
| Brand #1 | Yellow | Medium | Gas | 6.0 | 0003 |
| Brand #2 | Yellow | Medium | Gas | 8.0 | 0004 |
| Brand #1 | Yellow | Low | Gas | 10.0 | 0005 |
| Brand #2 | Yellow | Low | Gas | 12.0 | 0006 |
| Brand #1 | Blue | High | Water | 14.0 | 0007 |
| Brand #2 | Blue | High | Water | 16.0 | 0008 |
| Brand #1 | Blue | Medium | Water | 18.0 | 0009 |
| Brand #2 | Blue | Medium | Water | 20.0 | 0010 |
| Brand #1 | Blue | Low | Water | 22.0 | 0011 |
| Brand #2 | Blue | Low | Water | 24.0 | 0012 |
| Brand #1 | Orange | High | Tel/CATV | 26.0 | 0013 |
| Brand #2 | Orange | High | Tel/CATV | 28.0 | 0014 |
| Brand #1 | Orange | Medium | Tel/CATV | 30.0 | 0015 |
| Brand #2 | Orange | Medium | Tel/CATV | 32.0 | 0016 |
| Brand #1 | Orange | Low | Tel/CATV | 34.0 | 0017 |
| Brand #2 | Orange | Low | Tel/CATV | 36.0 | 0018 |
| Brand #1 | Green | High | Sewer | 38.0 | 0019 |
| Brand #2 | Green | High | Sewer | 40.0 | 0020 |
| Brand #1 | Green | Medium | Sewer | 42.0 | 0021 |
| Brand #2 | Green | Medium | Sewer | 44.0 | 0022 |
| Brand #1 | Green | Low | Sewer | 46.0 | 0023 |
| Brand #2 | Green | Low | Sewer | 48.0 | 0024 |
| Brand #1 | Red | High | Power | 50.0 | 0025 |
| Brand #2 | Red | High | Power | 52.0 | 0026 |
| Brand #1 | Red | Medium | Power | 54.0 | 0027 |
| Brand #2 | Red | Medium | Power | 56.0 | 0028 |
| Brand #1 | Red | Low | Power | 58.0 | 0029 |
| Brand #2 | Red | Low | Power | 60.0 | 0030 |

Referring to Table 1, spectral signature 0000 is an entry that correlates to no marking substance 134 being dispensed from marking dispenser 122. By contrast, all other spectral signatures (e.g., 0001-0030) are spectral signatures of respective colors or types of marking substances 134. Spectral signature 0000 is useful to detect that a marking dispenser 122 is becoming empty or is malfunctioning during a marking operation. For example, processor 150 may detect that trigger 126 is being pulled and at the same time optical sensor 210 may detect a spectral signature that substantially matches spectral signature 0000. This indicates that marking dispenser 122 is becoming empty or substantially empty of marking substance 134, or is malfunctioning. When trigger 126 is not being pulled, the spectral data that is received from optical sensor 210 may be ignored.

An aspect of this embodiment is that optical sensor 210 may be used for: (1) detecting the characteristics of marking substance 134, and (2) detecting that marking dispenser 122 is becoming empty or substantially empty, or is malfunctioning.

In this embodiment, detection algorithm 156 may process and interpret spectral information that is received from optical sensor 210, and then generate an appropriate response, if any. Details of the operation of marking device 100 including optical sensor 210 are described with reference to FIG. 3.

Figure 3:
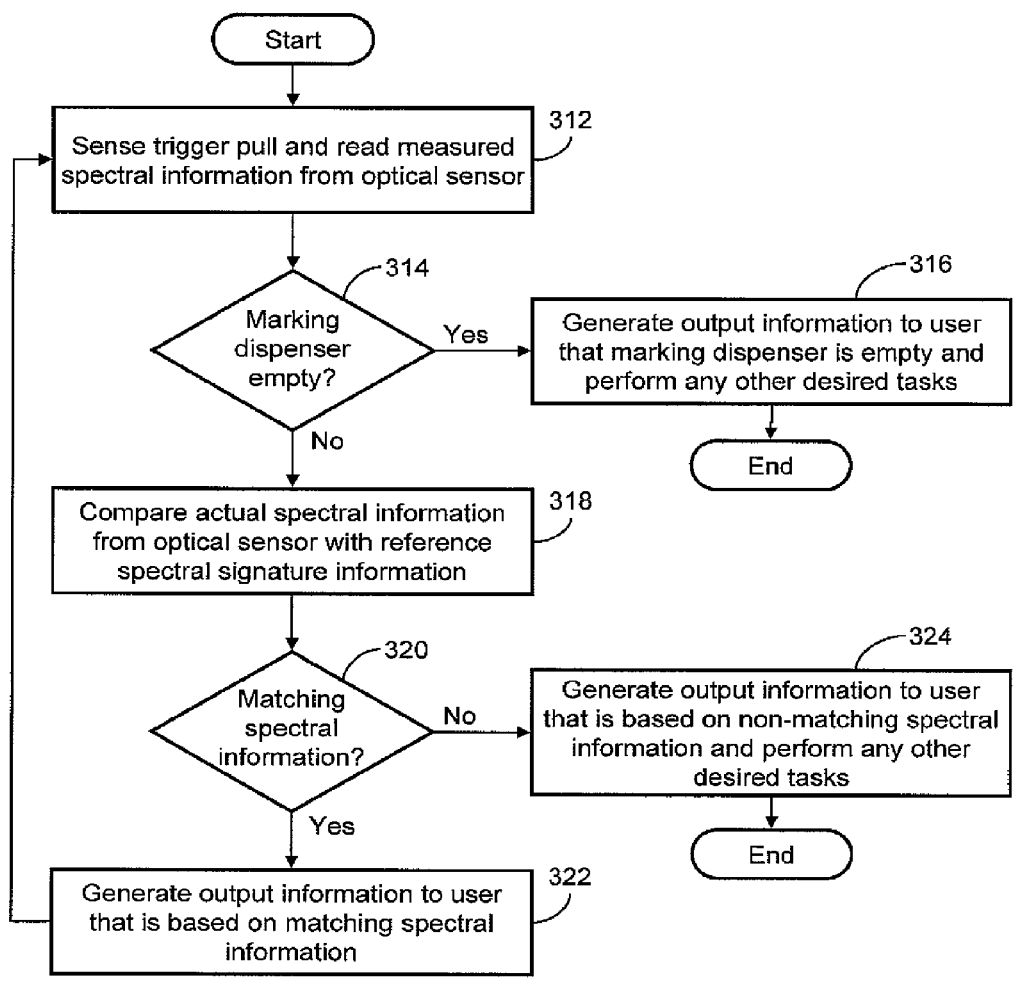
FIG. 3 is a flow diagram of an embodiment of a method of using the marking device that includes the optical sensor for identifying the composition and/or type of marking substance in the marking dispenser.

Referring now to FIG. 3, a flow diagram of a method 300 is shown. The method uses marking device 100 which includes optical sensor 210 for identifying the composition and/or type of marking substance in the marking dispenser. Method 300 may include, but is not limited to, the following acts. Additionally, the acts of method 300 are not limited to the following order.

In act 312, processor 150, executing detection algorithm 156, senses that trigger 126 is being pulled by the user of marking device 100 and reads the measured spectral information (via optical sensor 210) of the marking substance 134 that is being dispensed from marking device 100.

In act 314, detection algorithm 156 determines whether marking dispenser 122 is empty or substantially empty. For example, detection algorithm 156 determines whether the information received from optical sensor 210 substantially matches spectral signature 0000 of Table 1. If yes, method 300 proceeds to act 316. If no, method 300 proceeds to act 318.

In act 316, processor 150, executing detection algorithm 156, generates output information to the user of marking device 100 that marking dispenser 122 is becoming empty or is empty and performs any other desired tasks, such as, but not limited to, deactivating the trigger, transmitting a notification in real time to a remote server that marking dispenser 122 is becoming empty or is empty (i.e., a real-time alert to a supervisor that a user in the field may be spraying but no paint is being dispensed), and so on. For example, an OUT OF PAINT message may be displayed to the user via user interface 152 and trigger 126 may be deactivated, after which method 300 ends.

If the marking dispenser is not empty, method 300 proceeds to act 318, wherein detection algorithm 156 compares the measured spectral information received from optical sensor 210 (before or after preprocessing by processor 150) with the stored spectral signature information, for example, of Table 1. More specifically, detection algorithm 156 compares the measured spectral information received from optical sensor 210 with spectral signatures 0001 through n of Table 1 in order to determine a match. For example, a value of about 10 from optical sensor 210 corresponds to spectral signature 0005, a value of about 46 from optical sensor 210 corresponds to spectral signature 0023, a value of about 54 from optical sensor 210 corresponds to spectral signature 0027, and so on. Table 1 can be stored during execution of method 300 in a high speed memory associated with processor 150.

In act 320, based on the comparison of act 318, if a match is found between the measured spectral information from optical sensor 210 and at least one spectral signature of Table 1, method 300 proceeds to act 322. However, based on the comparison of act 318, if no match is found between the measured spectral information from optical sensor 210 and at least one spectral signature of Table 1, method 300 proceeds to act 324.

In act 322, processor 150, executing detection algorithm 156, generates output information to the user of marking device 100 indicating the characteristics of marking substance 134 that is installed in marking device 100. For example, if optical sensor 210 detects spectral information that substantially matches spectral signature 0009, the brand, color, durability, and approved usage that correlates with spectral signature 0009 (e.g., Brand #1, blue, medium durability, and water line) may be displayed to the user via user interface 152. Method 300 returns to act 312.

In act 324, processor 150, executing detection algorithm 156, generates output information to the user of marking device 100 that is based on non-matching of spectral information. For example, if optical sensor 210 detects spectral information that does not substantially match any spectral signature of Table 1, an UNKNOWN PAINT message may be displayed to the user via user interface 152 and, optionally, trigger 126 may be deactivated. Optionally, a notification may be transmitted to a remote server that the marking substance 134 in marking dispenser 122 does not match any expected spectral signatures (i.e., a real-time alert to a supervisor that a user in the field may be spraying an unknown marking substance), after which method 300 ends.

As described above, marker information may be provided to the user via user interface 152 in response to the measured spectral information. For example, the brand, color, durability and approved usage of the marking substance may be displayed to the user. The user can be prompted to verify that the detected characteristics of the marking substance are appropriate for the marking operation being performed. If yes, the user can enable the marking operation to proceed. If not, the user may signal the marking device to wait while the marking dispenser is changed or other required actions are taken. The processor 150 may also provide an out-of-paint message or an unknown paint message, depending on the measured spectral information. In other embodiments, the marking operation may be controlled automatically in response to the measured spectral information. For example, further dispensing of the marking substance may be inhibited if the characteristics of the marking substance detected by optical sensor 210 do not match preprogrammed parameters of the marking operation, such as underground utility type. In further embodiments, the measured spectral information, before or after preprocessing by processor 150, may be stored in storage device 154 and/or transmitted to a remote device for offline processing.

The optical sensor 210 is described above as a spectrometer for detecting spectral characteristics of the marking substance. It will be understood that a variety of different optical sensing configurations can be utilized within the scope of the present invention. In the embodiment of FIG. 2, optical sensor 210 senses reflected light from marking substance 134. In some embodiments, a light source can be utilized to illuminate the marking substance 134. The light source may be positioned adjacent to optical sensor 210 to permit sensing of reflected light from marking substance 134. In other embodiments, the light source can be positioned on the opposite side of marking substance 134 from optical sensor 210, so that light emitted by the light source is transmitted through marking substance 134 and is sensed by optical sensor 210. The light source can have broad band or narrow band spectral characteristics. The light source can be a DC source or can be pulsed or otherwise modulated to improve detection capability. The optical sensor 210 itself can have broad band or narrow band characteristics. Furthermore, optical fibers can be used to carry light to and from marking substance 134. The characteristics of optical sensor 210 and other optical components depends on the characteristics of the marking substance 134 to be detected and the conditions under which the marking device will be used.

Figure 4:
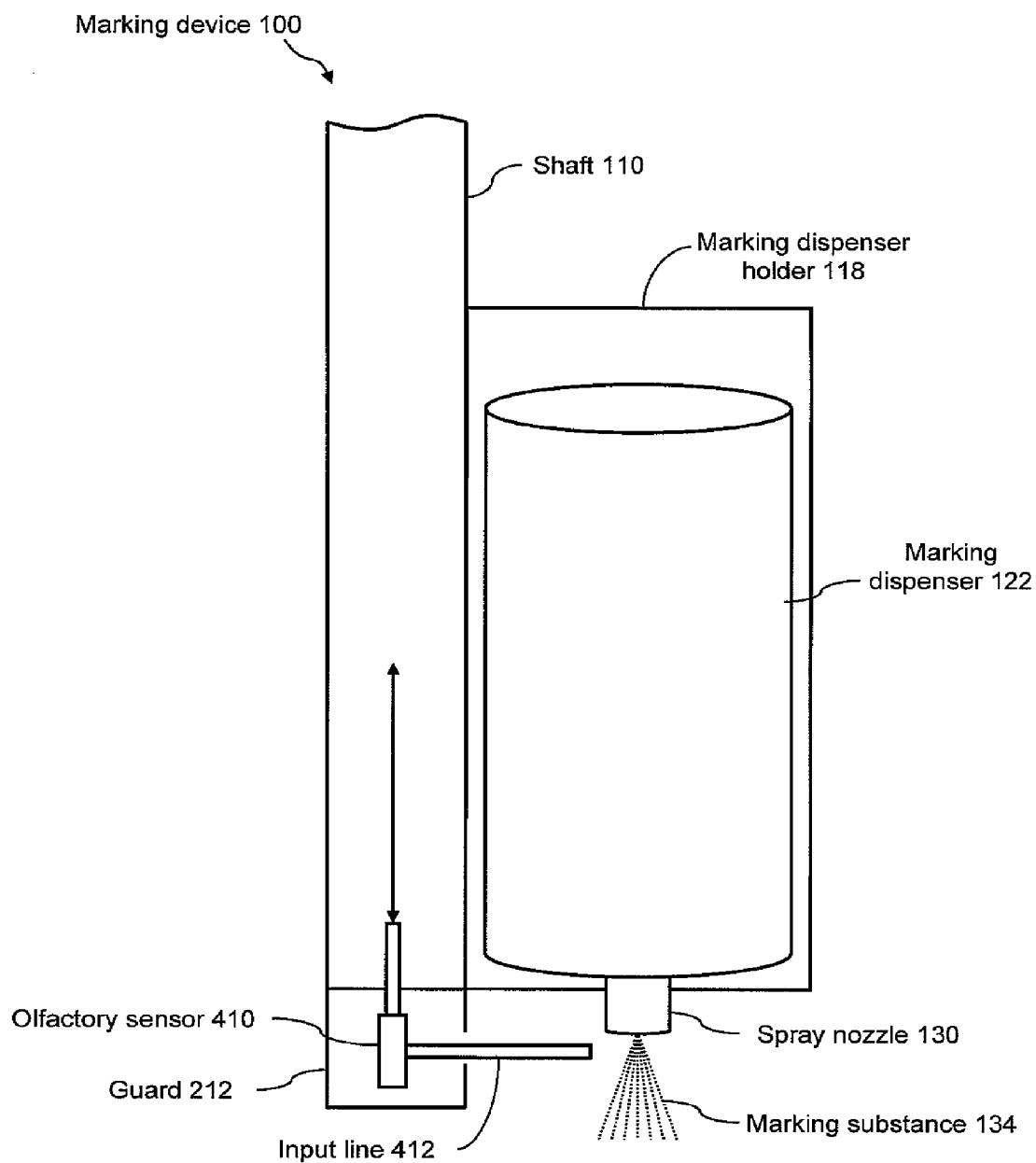
FIG. 4 is a schematic diagram of a marking device that includes an olfactory sensor.

FIG. 4 is a schematic diagram of the lower end of marking device 100, including a detection mechanism in the form of an olfactory sensor 410. Olfactory sensor 410 has an input line 412 mounted near marking dispenser holder 118, so that one end of input line 412 is in close proximity to marking substance 134 as it is dispensed from spray nozzle 130 of marking dispenser 122.

Olfaction refers to the sense of smell, and an olfactory sensor is a device for mimicking human olfaction. An olfactory sensor may also be known as an electronic nose, e-nose, ENose, artificial nose, and so on. Input line 412 may be a hollow tube that is used to direct vapor emitted by marking substance 134 to the detection system of olfactory sensor 410. Guard 212 may be provided. In this embodiment, guard 212 may be designed as a wind guard to limit wind interference with olfactory sensing of marking substance 134.

The detection system of an olfactory sensor is the "reactive" portion of the instrument. When in contact with volatile compounds, the sensors react, which means they experience a change of electrical properties. Most olfactory sensors use sensor arrays that react to volatile compounds on contact. For example, the adsorption of volatile compounds on the sensor surface causes a physical change of the sensor. A specific response is recorded by the electronic interface thereof for transforming the physical change to an electrical signal. The more commonly used olfactory sensors include metal oxide semiconductors (MOS), conducting polymers (CP), quartz crystal microbalance, surface acoustic wave (SAW), and field effect transistors (MOSFET). Commercially available low power, compact olfactory sensors may be suitable for use as olfactory sensor 410 of marking device 100. The signal provided by olfactory sensor 410 depends on the type of olfactory sensor used and may be a digital or analog signal. The output signal of olfactory sensor 410 may be utilized directly by processor 150 to determine the characteristics of marking substance 134 or may be preprocessed to simplify analysis. For example, processor 150 may convert the measured olfactory information to a numerical value for comparison with the values in Table 2 below.

In this embodiment, the olfactory signature of each of the possible colors, types, manufacturers, and so on of marking substances 134 are predetermined and stored, for example, in storage device 154. Optionally, certain unique fragrances may be added to the chemical formulations of each composition and/or type of marking substance 134 in order to provide a unique detectable scent for each different composition and/or type of marking substance 134.

In a learning mode, the olfactory sensor 410 may be used to measure the olfactory information of each composition and/or type of marking substance 134 of interest. The olfactory measurements of the different compositions and/or types of marking substances 134 may be stored in order to provide a set of reference olfactory signatures for later comparison with measured olfactory signatures. Then, the same olfactory sensor 410 is used to measure the olfactory signatures of marking substances dispensed by the marking device. In this approach, the effect of differences among olfactory sensors 410 is eliminated. In another approach, olfactory signatures are measured by a reference olfactory sensor to provide reference olfactory signatures, and the reference olfactory signatures are provided, such as by downloading, to one or more marking devices. The detected olfactory signature of marking substance 134 is compared to the reference olfactory signatures to identify the marking substance 134 being dispensed.

Table 2 below shows an example of reference olfactory signature information that may be stored in storage device 154. The information correlates specified marking substances 134 to predetermined olfactory signatures.

TABLE 2

Marking Substance vs. Expected Olfactory Signature

| Brand | Color | Durability | Approved Marking Use | Olfactory Sensor Reading | Olfactory Signature |
|---|---|---|---|---|---|
| None | Clear | N/A | N/A | 0.0 | 0000 |
| Brand #1 | Yellow | High | Gas | 2.0 | 0001 |
| Brand #2 | Yellow | High | Gas | 4.0 | 0002 |
| Brand #1 | Yellow | Medium | Gas | 6.0 | 0003 |
| Brand #2 | Yellow | Medium | Gas | 8.0 | 0004 |
| Brand #1 | Yellow | Low | Gas | 10.0 | 0005 |
| Brand #2 | Yellow | Low | Gas | 12.0 | 0006 |
| Brand #1 | Blue | High | Water | 14.0 | 0007 |
| Brand #2 | Blue | High | Water | 16.0 | 0008 |
| Brand #1 | Blue | Medium | Water | 18.0 | 0009 |

TABLE 2-continued

Marking Substance vs. Expected Olfactory Signature

| Brand | Color | Durability | Approved Marking Use | Olfactory Sensor Reading | Olfactory Signature |
|---|---|---|---|---|---|
| Brand #2 | Blue | Medium | Water | 20.0 | 0010 |
| Brand #1 | Blue | Low | Water | 22.0 | 0011 |
| Brand #2 | Blue | Low | Water | 24.0 | 0012 |
| Brand #1 | Orange | High | Tel/CATV | 26.0 | 0013 |
| Brand #2 | Orange | High | Tel/CATV | 28.0 | 0014 |
| Brand #1 | Orange | Medium | Tel/CATV | 30.0 | 0015 |
| Brand #2 | Orange | Medium | Tel/CATV | 32.0 | 0016 |
| Brand #1 | Orange | Low | Tel/CATV | 34.0 | 0017 |
| Brand #2 | Orange | Low | Tel/CATV | 36.0 | 0018 |
| Brand #1 | Green | High | Sewer | 38.0 | 0019 |
| Brand #2 | Green | High | Sewer | 40.0 | 0020 |
| Brand #1 | Green | Medium | Sewer | 42.0 | 0021 |
| Brand #2 | Green | Medium | Sewer | 44.0 | 0022 |
| Brand #1 | Green | Low | Sewer | 46.0 | 0023 |
| Brand #2 | Green | Low | Sewer | 48.0 | 0024 |
| Brand #1 | Red | High | Power | 50.0 | 0025 |
| Brand #2 | Red | High | Power | 52.0 | 0026 |
| Brand #1 | Red | Medium | Power | 54.0 | 0027 |
| Brand #2 | Red | Medium | Power | 56.0 | 0028 |
| Brand #1 | Red | Low | Power | 58.0 | 0029 |
| Brand #2 | Red | Low | Power | 60.0 | 0030 |

Referring to Table 2, olfactory signature 0000 is an entry that correlates to no marking substance 134 being dispensed from marking dispenser 122. By contrast, all other olfactory signatures (e.g., 0001-0030) are olfactory signatures of respective colors or types of marking substances 134. Olfactory signature 0000 is useful to detect when a marking dispenser 122 is becoming empty or is malfunctioning during a marking operation. For example, processor 150 may detect that trigger 126 is being pulled and at the same time, olfactory sensor 410 may detect an olfactory signature that substantially matches olfactory signature 0000. This indicates that marking dispenser 122 is becoming empty or substantially empty of marking substance 134, or is malfunctioning. When trigger 126 is not being pulled, the olfactory data that is returned from olfactory sensor 410 may be ignored.

An aspect of this embodiment is that olfactory sensor 410 may be used for: (1) detecting the characteristics of marking substance 134, and (2) detecting when marker dispenser 122 is becoming empty or substantially empty, or is malfunctioning.

In this embodiment, detection algorithm 156 may process and interpret olfactory information that is received from olfactory sensor 410 and then generate an appropriate response, if any. Details of the operation of marking device 100 including olfactory sensor 410 are described with reference to FIG. 5.

Figure 5:
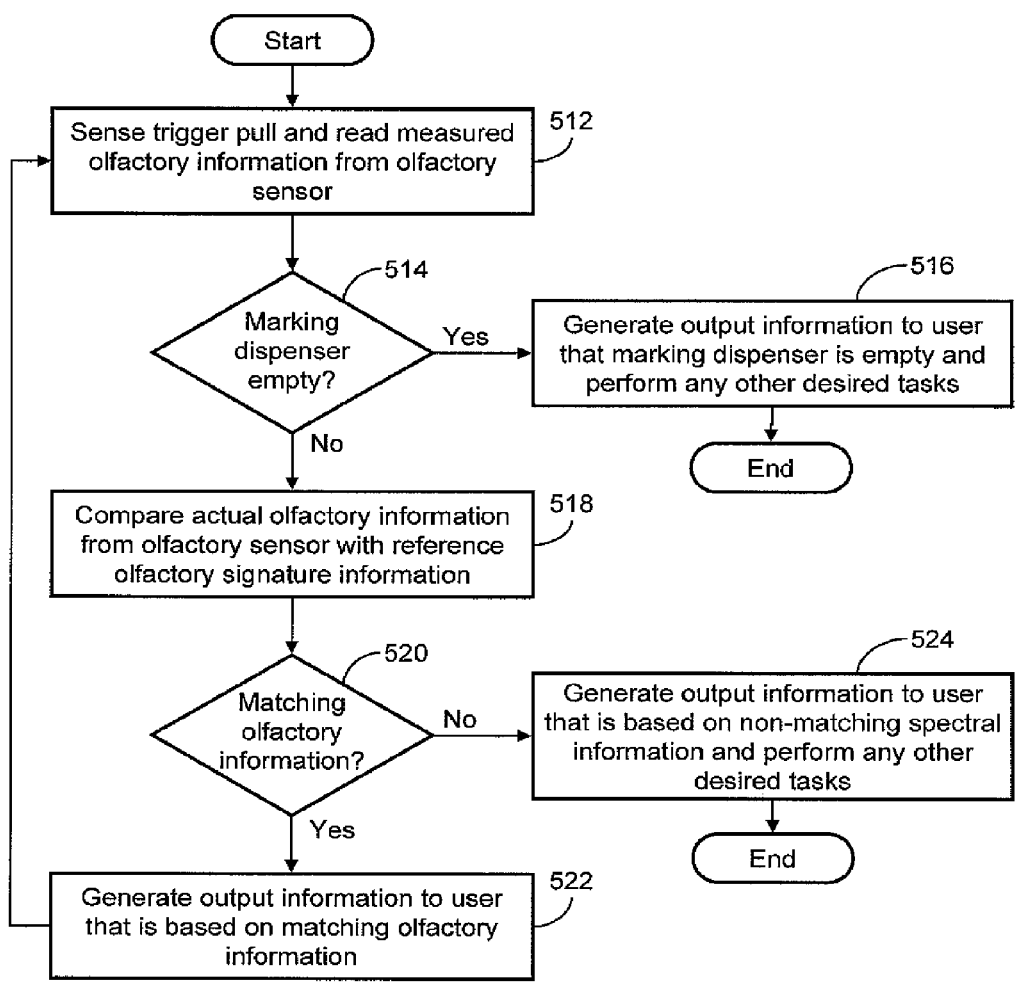
FIG. 5 is a flow diagram of a method of using the marking device that includes the olfactory sensor for identifying the composition and/or type of marking substance in the marking dispenser.

Referring now to FIG. 5, a flow diagram of a method 500 is shown. The method uses marking device 100 which includes olfactory sensor 410 for identifying the composition and/or type of marking substance in the marking dispenser. Method 500 may include, but is not limited to, the following acts. Additionally, the acts of method 500 are not limited to the following order.

In act 512, processor 150, executing detection algorithm 156, senses that trigger 126 is being pulled by the user of marking device 100 and reads the measured olfactory information (via olfactory sensor 410) of the marking substance 134 that is being dispensed from marking device 100.

In act 514, detection algorithm 156 determines whether marking dispenser 122 is becoming empty or substantially empty. For example, detection algorithm 156 determines whether the information received from olfactory sensor 410 substantially matches olfactory signature 0000 of Table 2. If yes, method 500 proceeds to act 516. If no, method 500 proceeds to act 518.

In act 516, processor 150, executing detection algorithm 156, generates output information to the user of marking device 100 that marking dispenser 122 is becoming empty or is empty and performs any other desired tasks, such as, but not limited to, deactivating the trigger, transmitting a notification in real time to a remote server that marking dispenser 122 is becoming empty or is empty (i.e., a real-time alert to a supervisor that a user in the field may be spraying but no paint is being dispensed), and so on. For example, an OUT OF PAINT message may be displayed to the user via user interface 152 and trigger 126 may be deactivated, after which method 500 ends.

If the marking dispenser is not empty, method 500 proceeds to act 518, wherein detection algorithm 156 compares the measured olfactory information received from olfactory sensor 410 (before or after preprocessing by processor 150) with the stored olfactory signature information, for example, of Table 2. More specifically, detection algorithm 156 compares the measured olfactory information received from olfactory sensor 410 with olfactory signatures 0001 through n of Table 2 in order to determine a match. For example, a value of about 4 from olfactory sensor 410 corresponds to olfactory signature 0002, a value of about 22 from olfactory sensor 410 corresponds to olfactory signature 0011, a value of about 60 from olfactory sensor 410 corresponds to olfactory signature 0030, and so on. Table 2 can be stored during execution of method 500 in a high speed memory associated with processor 150.

In act 520, based on the comparison of act 518, if a match is found between the measured olfactory information from olfactory sensor 410 and at least one olfactory signature of Table 2, method 500 proceeds to act 522. However, based on the comparison of act 518, if no match is found between the measured olfactory information from olfactory sensor 410 and at least one olfactory signature of Table 2, method 500 proceeds to act 524.

In act 522, processor 150, executing detection algorithm 156, generates output information to the user of marking device 100 indicating the characteristics of marking substance 134 that is installed in marking device 100. For example, if olfactory sensor 410 returns olfactory information that substantially matches olfactory signature 0009, the brand, color, durability, and approved usage that correlates with olfactory signature 0009 (e.g., Brand #1, blue, medium durability, and water line) may be displayed to the user via user interface 152. Method 500 returns to act 512.

In act 524, processor 150, executing detection algorithm 156, generates output information to the user of marking device 100 that is based on non-matching of olfactory information. For example, if olfactory sensor 410 detects olfactory information that does not substantially match any olfactory signature of Table 2, an UNKNOWN PAINT message may be displayed to the user via user interface 152 and, optionally, trigger 126 may be deactivated. Optionally, a notification may be transmitted to a remote server that the marking substance 134 in marking dispenser 122 does not match any expected spectral signatures (i.e., a real-time alert to a supervisor that a user in the field may be spraying an unknown marking substance), after which method 500 ends.

Figure 6:
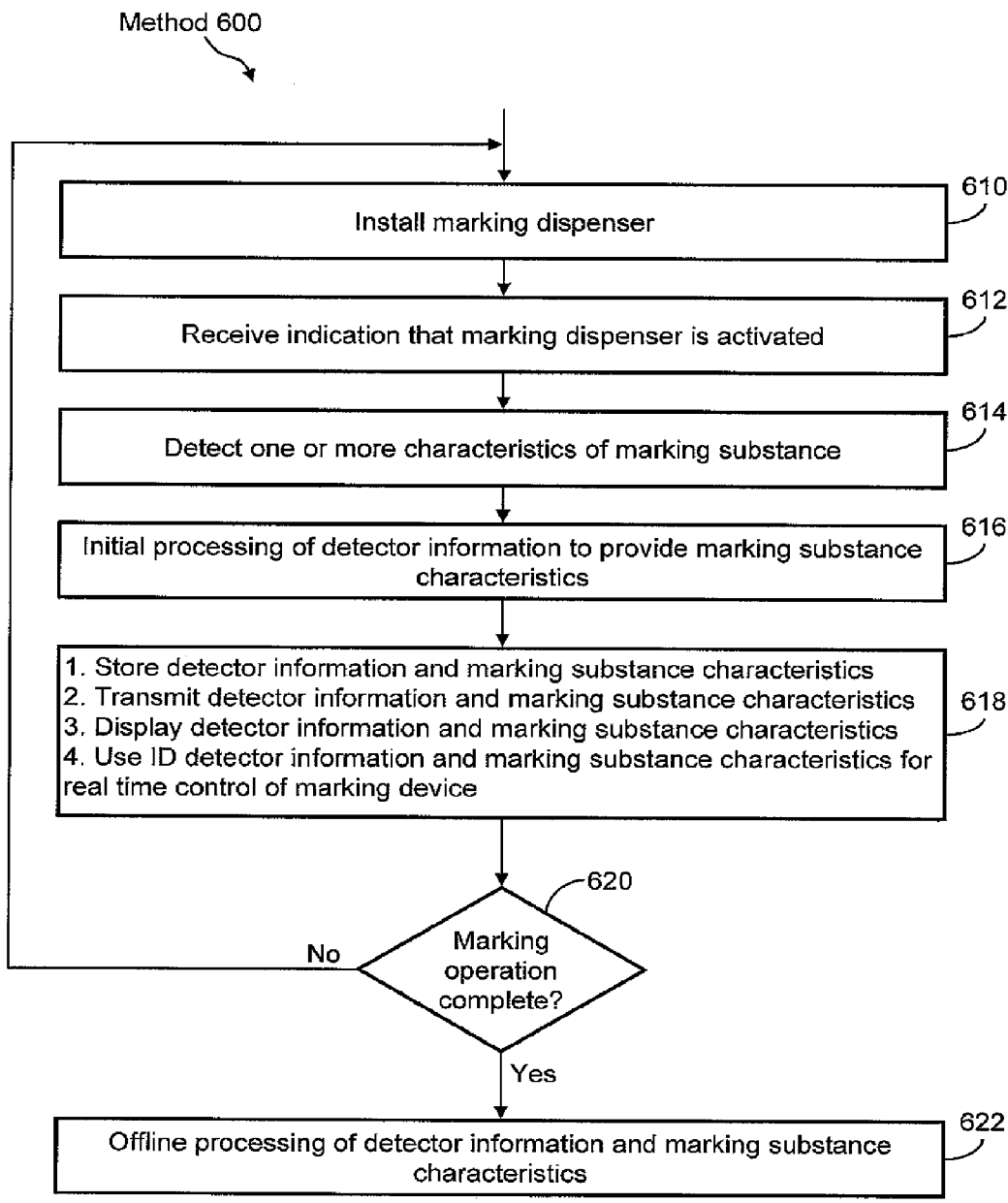
FIG. 6 is a flow diagram of a method of using a detection mechanism in a system for processing marking substance information.

FIG. 6 is a flow diagram of a method 600 of operating marking device 100. The method 600 is described with reference to the marking device 100 shown in FIG. 1 and described above. The method uses one or more of the detection mechanisms described herein in a system for processing marking substance information. By way of example, method 600 is an example of using optical sensor 210 of FIG. 2 in one or more marking devices 100 in a system for processing marking substance information. Alternatively, method 600 may be modified for marking devices 100 that include olfactory sensors 410 of FIG. 4. Method 600 may include, but is not limited to, the following acts.

In act 610, marking dispenser 122 is installed by the user in the marking device 100. By way of example, marking dispenser 122 may be an aerosol can containing a marking paint. Marking device 100 may include an optical sensor 210. Optical sensor 210 may be used to identify the color or any other characteristic of the marking substance 134 by comparing detected spectral information with reference spectral signatures of marking substances 134. In one example, optical sensor 210 is installed in a marking device, such as the marking devices that are described in the U.S. patent application Ser. No. 11/696,606 and U.S. patent application Ser. No. 11/685,602.

In act 612, the trigger 126 of the marking device 100 is pulled or otherwise activated by the user in order to dispense a quantity of marking substance 134 from the marking dispenser 122 onto the ground. The processor 150 receives an indication that the marking dispenser 122 has been activated to dispense the marking substance 134.

In act 614, processor 150 instructs detection mechanism 140 to detect one or more characteristics of marking substance 134. For example, processor 150 may issue a command to detection mechanism 140 to detect marking substance 134 in response to the user activating the trigger 126. In one example, optical sensor 210 may be used to detect the color and/or any other characteristic of marking substance 134. In another example, olfactory sensor 410 may be used to detect the color and/or any other characteristic of marking substance 134. The detector information acquired by detection mechanism 140 is supplied by detection mechanism 140 to processor 150.

In the embodiment where optical sensor 210 is used, spectral information of marking substance 134 is supplied by optical sensor 210 to processor 150. For example, the action of pulling trigger 126 of marking device 100 to dispense marking substance 134 onto the ground may initiate optical sensor 210. Optical sensor 210 measures the spectral characteristics of marking substance 134 that is dispensed from marking dispenser 122. Processor 150, executing detection algorithm 156, processes the detector information received from optical sensor 210 to determine the color or any other characteristic of marking substance 134. For example and referring to Table 1, a value of about 8 from optical sensor 210 corresponds to optical signature 0004, a value of about 18 from optical sensor 210 corresponds to optical signature 0009, a value of about 52 from optical sensor 210 corresponds to optical signature 0026, and so on. Subsequently, processor 150, executing detection algorithm 156, generates output information to the user of marking device 100 indicating the type of marking substance 134 in marking dispenser 122. For example, if optical sensor 210 detects spectral information that substantially matches spectral signature 0009 of Table 1, the brand, color, durability, and approved usage that correlates with spectral signature 0009 (e.g., Brand #1, blue, medium durability, and water line) may be displayed to the user via user interface 152. In this way, the user may verify immediately that the intended marking substance 134 (e.g., intended color or any other attribute) has been installed in marking device 100.

In act 616, processor 150 performs initial processing of the detector information received from detection mechanism 140 to provide one or more marking substance characteristics. By way of example only, spectral information provided by optical sensor 210 may be processed to determine the color of the marking substance being dispensed by marking dispenser 122. The marking substance characteristics may be compared with reference information as described above to identify the marking substance 134. In other embodiments, the detector information received from detection mechanism 140 includes marking substance characteristics and can be compared directly with the reference information. Thus, the detector information received from detection mechanism 140 may include information which requires initial processing by processor 150 to provide marking substance characteristics and/or may include marking substance information without initial processing.

In block 618, acts involving utilization of the detector information and/or the marking substance characteristics are shown. As used herein, "marker information" includes detector information and/or marking substance characteristics, or a selected subset of such information. The acts shown in block 518 may be performed separately or in any combination. The acts of block 518 may be performed or not performed, depending on the operating state and the application of marking device 100. Also, additional acts may involve the marker information.

In act 618.1, the marker information is stored locally in storage device 154 of marking device 100. The marker information can be stored separately or with other data in an electronic record of a marking operation or of operation of the marking device. The stored information, or a selected subset thereof, can be processed locally and/or transmitted to a remote device for processing, can be displayed on a display device and/or an indicator, and/or can be used for real-time control of the marking device, for example.

In act 618.2, the marker information is transmitted by communications interface 158 to a remote device. Examples of the remote device include, for example, a computer located in the vehicle of the user or a remote server, or both. Communications interface 158 may utilize wireless communication and/or a wired connection for transmission of the marker information. In one example of a wired connection, when the user returns to his/her home base, the marking device may be connected by a wired connection to a central computing device. In particular, the marking device may be coupled to a docking station (not shown) that is designed to connect with the communications interface 158. The marker information that is stored locally within storage device 154 may be transmitted to the central computing device.

In act 618.3, the marker information may be displayed to the user, for example, on a display screen and/or by indicators. The marker information may be for information only or may require user action, such as verifying that the marking dispenser is appropriate for the intended application. The display of marker information provides feedback to the user and permits verification that the intended marking dispenser 122 has been installed.

In act 618.4, the marker information is used for real time control of the marking device 100. Thus, for example, selected marker information may be compared with reference information, for example, entered by the user or downloaded to marking device 100. In the absence of a match, dispensing of the marking substance 134 from marking dispenser 122 may be inhibited automatically. Other real-time control applications are included within the scope of the invention.

In act 620, a determination is made by processor 150 as to whether the marking operation is complete. For example, the user may indicate that it is necessary to install another marking dispenser of the same color in order to complete the marking operation or may indicate that another facility is to be marked at the same site, thus requiring installation of a marking dispenser of a different color. When the marking operation is not complete, the process returns to act 610.

When the marking operation is complete, as determined in act 620, the marker information which has been stored in storage device 154 and/or transmitted to a remote device is ready for offline processing. By way of example only, offline processing may include compilation of data for a particular job site and/or determination of trends and statistics for multiple users. In another example, marker information may be processed for the purpose of tracking the inventory of marking dispensers 122. More specifically, marker information may be processed in order to analyze the usage of marking dispensers 122, such as, but not limited to, the number of dispensers used and by which users. In a further example, the marker information may be processed for the purpose of quality control, such as to verify that the proper marking substances have been used in the assigned marking operations. The marker information is not limited to the uses mentioned above. The marker information may be used for any purpose (e.g., real-time product verification, tracking which user-location received which batch of marking paint, tracking marking paint inventory, tracking marking paint problems, tracking marking paint usage, and so on).

Figure 7:
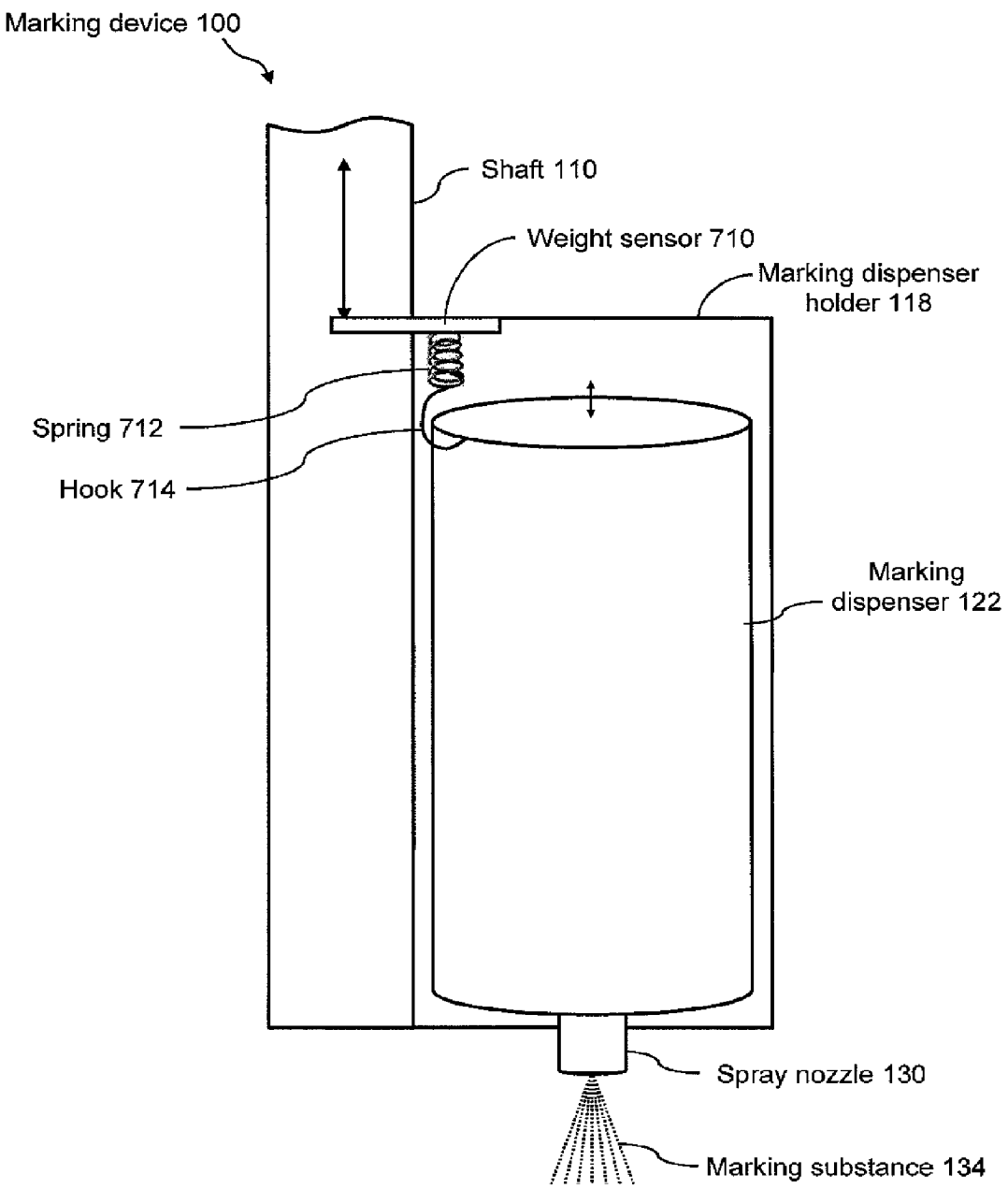
FIG. 7 is a schematic diagram of a marking device that includes a weight sensor.

FIG. 7 is a schematic diagram of the lower end of marking device 100, including a detection mechanism in the form of a weight sensor 710. Weight sensor 710 may be coupled, for example, to the end of marking dispenser holder 118 that is opposite spray nozzle 130 of marking dispenser 122, as shown in FIG. 7. Weight sensor 710 may be, for example, any commercially available weight sensing device, such as any low power, compact load cell device.

Weight sensor 710 may be mechanically coupled to marking dispenser 122 such that marking dispenser 122 hangs freely therefrom. In one example, weight sensor 710 may be coupled to the lip of marking dispenser 122 via a spring 712 and a hook 714 arrangement, such as shown in FIG. 7. Depending on the amount of marking substance 134 in marking dispenser 122, marking dispenser 122 presents a variable load (as marking substance 134 is dispensed) that may be measured by weight sensor 710. The coupling of weight sensor 710 to marking dispenser 122 is not limited to the arrangement shown in FIG. 7, and any coupling mechanism that allows the variable load to be sensed by weight sensor 710 is acceptable.

In this embodiment, weight sensor 710 may be calibrated for both the full and empty (or substantially empty) weight of marking dispenser 122 in order to allow detection algorithm 156 to correlate the weight of marking dispenser 122 to the amount of marking substance 134 in marking dispenser 122. The relationship between the measured amount of marking substance 134 in marking dispenser 122 and the estimated marking distance may be predetermined. Therefore, the weight of marking dispenser 122 may be further correlated to an estimated marking distance which the measured amount of marking substance 134 is capable of marking.

Table 3 below shows an example of reference weight information that may be stored in storage device 154. The information correlates weight to percent (%) full and estimated marking distance. This correlation may be stored as predetermined weight signatures.

TABLE 3

Marking Substance vs. Expected Weight Signature

| Weight in ounces | % Full | Marking Distance in Feet | Weight Signature |
|---|---|---|---|
| 0 | 0 | 0 | 0000 |
| 1 | 0 | 0 | 0000 |
| 2 | 0 | 0 | 0000 |
| 3 | 5 | 50 | 0001 |
| 4 | 10 | 100 | 0002 |
| 5 | 15 | 150 | 0003 |
| 6 | 20 | 200 | 0004 |
| 7 | 25 | 250 | 0005 |
| 8 | 30 | 300 | 0006 |
| 9 | 35 | 350 | 0007 |
| 10 | 40 | 400 | 0008 |
| 11 | 45 | 450 | 0009 |
| 12 | 50 | 500 | 0010 |
| 13 | 55 | 550 | 0011 |
| 14 | 60 | 600 | 0012 |
| 15 | 65 | 650 | 0013 |
| 16 | 70 | 700 | 0014 |
| 17 | 75 | 750 | 0015 |
| 18 | 80 | 800 | 0016 |
| 19 | 85 | 850 | 0017 |
| 20 | 90 | 900 | 0018 |
| 21 | 95 | 950 | 0019 |
| 22 | 100 | 1000 | 0020 |

Referring to Table 3, weight signature 0000 is an entry that correlates to marking dispenser 122 being empty or substantially empty of marking substance 134. By contrast, all other weight signatures (e.g., 0001-0020) are weight signatures of marking dispenser 122 containing at least some usable quantity of marking substance 134. Based on Table 3, a message may be displayed to the user via user interface 152 as to the amount of marking substance 134 in marking dispenser 122 and/or the estimated marking distance capability of marking dispenser 122.

Weight signature 0000 is useful to detect that a marking dispenser 122 is becoming empty during a marking operation. For example, processor 150 may detect that trigger 126 is being pulled and at the same time weight sensor 710 may detect a weight signature that substantially matches weight signature 0000. This indicates that marking dispenser 122 is empty or substantially empty of marking substance 134. Because weight sensor 710 detects the weight of marking dispenser 122 rather than detecting the marking substance 134 being dispensed, the weight measurement can be performed any time that a marking dispenser 122 is installed in the marking device. For example, the weight can be measured when the marking substance 134 is being dispensed, upon installation of a marking dispenser in the marking device, upon power up of the marking device, or at any other time.

In this embodiment, detection algorithm 156 may process and interpret weight information received from weight sensor 710 and then generate an appropriate response, if any. When in use, the movement and/or changing angle of marking substance 134 within marking device 100 may cause readings from weight sensor 710 to vary. Consequently, it may be preferred to sample the output of weight sensor 710 and then process multiple load measurements in order to determine the weight of marking dispenser 122.

An aspect of this embodiment is that weight sensor 710 may be used for: (1) determining in advance of or during a marking operation the amount of marking substance 134 in marking dispenser 122, and (2) detecting that marking dispenser 122 is empty or substantially empty. By knowing in advance the amount of marking substance 134 in a full or partially full marking dispenser 122, a user may better select a marking dispenser 122 that is suited for the expected application. Additionally, the efficiencies that may be gained by knowing in advance the amount of marking substance 134 in marking dispenser 122 may cause the users to be less wasteful with marking dispensers 122.

Another aspect of this embodiment is that the user of marking device 100 may be able to estimate in advance the number of marking dispensers 122 required for a specified marking distance. For example, for a marking distance of 3500 feet, knowing in advance that one full marking dispenser 122 can mark about 1000 feet, the user may have at least four marking dispensers 122 available (including the marking dispenser 122 that may be already installed in marking device 100) upon beginning the marking operation.

As shown in Table 3, the weight of the marking dispenser indicates the amount of marking substance remaining and also indicates the estimated marking distance available with the marking dispenser. In other embodiments, the estimated marking distance may be based on usage of the marking dispenser, as indicated, for example, by the distance already marked with the same marking dispenser or the time of actuation of the same marking dispenser.

In the embodiment described above, weight sensor 710 is used to determine the amount of marking substance in the marking dispenser by comparison of the detected weight with reference weight signatures. In another embodiment, weight sensor 710 can be used to determine if the marking dispenser 122 is empty or nearly empty by comparison of the detected weight with a threshold value that represents the weight of an empty or nearly empty marking dispenser. The result of the comparison can be used to indicate that marking dispenser 122 is empty or nearly empty.

Figure 8:
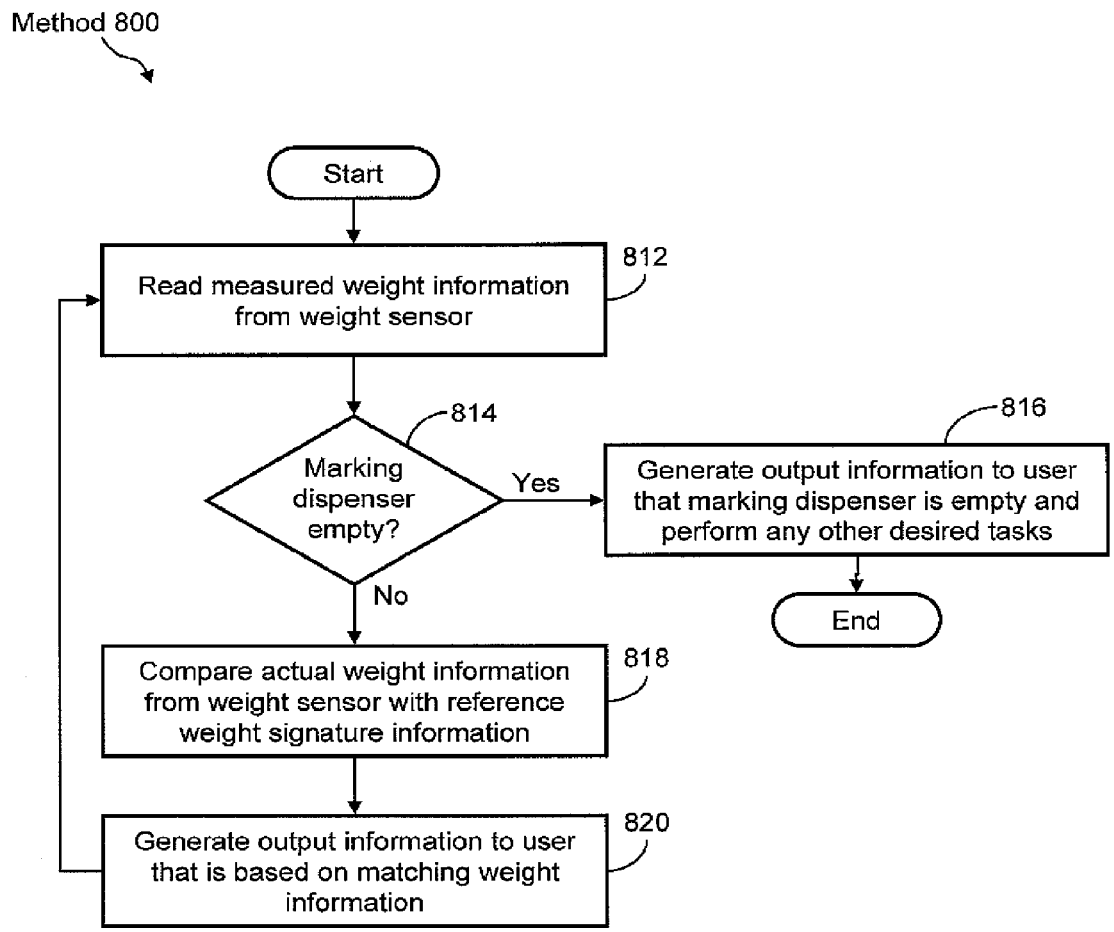
FIG. 8 is a flow diagram of a method of using the marking device that includes the weight sensor for determining the amount of marking substance in the marking dispenser.

Referring now to FIG. 8, a flow diagram of a method 800 is shown. The method uses marking device 100 which includes weight sensor 710 for determining the amount of marking substance in the marking dispenser. Method 800 may include, but is not limited to, the following acts. Additionally, the acts of method 800 are not limited to the following order.

In act 812, processor 150, executing detection algorithm 156, reads the measured weight information (via weight sensor 710) of marking dispenser 122 of marking device 100.

In act 814, processor 150, executing detection algorithm 156, determines whether marking dispenser 122 is empty or substantially empty. For example, detection algorithm 156 determines whether the information that is received from weight sensor 710 substantially matches weight signature 0000 of Table 3. If yes, method 800 proceeds to act 816. If no, method 800 proceeds to act 818.

In act 816, processor 150, executing detection algorithm 156, generates output information to the user of marking device 100. The output information indicates that marking dispenser 122 is empty or substantially empty. The processor 150 performs any other desired tasks, such as, but not limited to, deactivating the trigger, transmitting a notification in real time to a remote server that marking dispenser 122 is empty or substantially empty (i.e., a real-time alert to a supervisor that a user in the field may be spraying but no paint is being dispensed) and so on. For example, an OUT OF PAINT message may be displayed to the user via user interface 152 and trigger 126 may be deactivated, after which method 800 ends.

If the marking dispenser is not empty, method 800 proceeds to act 818, wherein detection algorithm 156 compares in real time the measured weight information that is received from weight sensor 710 with the stored weight signature information, for example, of Table 3. More specifically, detection algorithm 156 compares the measured weight information that is received from weight sensor 710 with, for example, weight signatures 0001 through n of Table 3 in order to determine a match.

In act 820, processor 150 executing detection algorithm 156 generates output information to the user of marking device 100 indicating the characteristics of marking substance 134. For example, if weight sensor 710 detects weight information that substantially matches weight signature 0009, the percent (%) full and marking distance that correlates with weight signature 0009 (e.g., 45% and 450 feet) may be displayed to the user via user interface 152. Method 800 returns to act 812.

Figure 9:
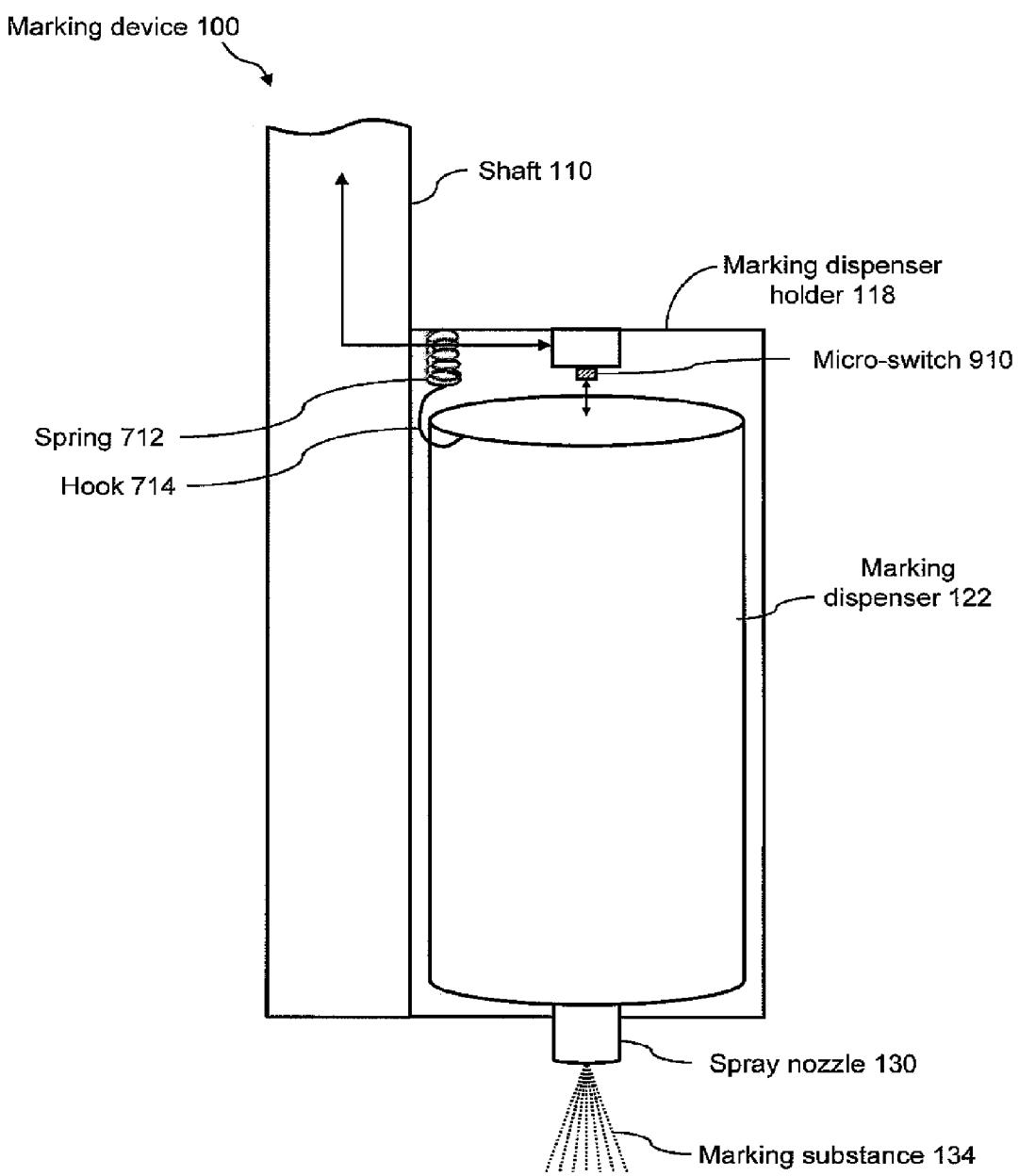
FIG. 9 is a schematic diagram of a marking device that includes an out-of-paint sensor.

FIG. 9 is a schematic diagram of the lower end of marking device 100, including a detection mechanism in the form of an out-of-paint sensor, such as a switch 910. Switch 910 may be coupled, for example, to the end of marking dispenser holder 118 that is opposite spray nozzle 130 of marking dispenser 122, as shown in FIG. 9. Switch 910 may be, for example, any commercially available switch device, such as a push-button toggle switch. In this example, the push-button of switch 910 is oriented in the direction of marking dispenser 122.

Marking dispenser holder 118 may be mechanically coupled to marking dispenser 122 such that marking dispenser 122 hangs freely therefrom. In one example, marking dispenser holder 118 may be coupled to the lip of marking dispenser 122 via a spring 712 and a hook 714. Depending on the amount of marking substance 134 in marking dispenser 122, marking dispenser 122 presents a variable load (as marking substance 134 is dispensed) that is supported by spring 712 and hook 714.

In this embodiment, the tension of spring 712 may be selected to provide a known travel between marking dispenser 122 being full and being empty or substantially empty. In particular, the tension of spring 712 may be selected such that when any usable quantity of marking substance 134 is present in marking dispenser 122, the body of marking dispenser 122 is not in contact with switch 910 due to the weight of marking substance 134 pulling downward on spring 712. By contrast, when marking dispenser 122 is empty or substantially empty of marking substance 134, the body of marking dispenser 122 may come into contact with switch 910 because the weight of marking dispenser 122 is not sufficient to pull spring 712 downward and away from switch 910. In this way, an out-of-paint sensor may be formed by use of switch 910.

An aspect of this embodiment is that switch 910 may be used as an out-of-paint sensor for detecting that marking dispenser 122 is empty or substantially empty. In this embodiment, detection algorithm 156 may process and interpret the state of switch 910 in order to generate, for example, an OUT OF PAINT message which may be displayed to the user of marking device 100 via user interface 152. Optionally, trigger 126 may be disabled in the event of an OUT OF PAINT condition.

It is contemplated that the detection mechanism 140 of marking device 100 and methods of the present invention may include optical sensor 210, olfactory sensor 410, weight sensor 710, switch 910 (i.e., an out-of-paint sensor), and any combinations thereof. The detection mechanism 140 may directly detect the marking substance 134, as in the case of optical sensor 210 and olfactory sensor 410, or may indirectly detect marking substance 134, as in the case of weight sensor 710 and switch 910. Furthermore, the detections mechanism 140 of marking device 100 and methods of the present invention are not limited to optical sensors, olfactory sensors, weight sensors, and out-of-paint sensors. Other types of sensors may be used for identifying the composition and/or type of marking substance and/or determining whether the paint dispenser is becoming empty. In one example of determining whether the paint dispenser is becoming empty, sound sensing devices may be used for detecting the sound of marking substance 134 being sprayed from marking dispenser 122. In addition, marking device 100 may include more than one detection mechanism of the same type or of different types. For example, marking device 100 may include two or more optical sensors or may include an optical sensor and a weight sensor.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A marking apparatus to mark a presence or an absence of an underground facility in a dig area, the marking apparatus comprising:
    a housing configured to enable dispensing of a marking substance onto ground for marking the presence or the absence of the underground facility in the dig area;
    a marking dispenser holder affixed to the housing to hold at least one marking dispenser;
    an actuator communicatively coupled to the marking dispenser to cause the dispensing of the marking substance from the marking dispenser onto the ground in the dig area;
    an optical sensor, coupled to the housing and disposed proximate to the marking dispenser, to provide sensor information representative of a color of the marking substance in the marking dispenser; and
    a processing device, coupled to the optical sensor, to generate output information in response to the sensor information, the output information indicative of the color of the marking substance.

2. The marking apparatus of claim 1, further comprising a user interface coupled to the processing device, wherein the processing device provides selected information to the user interface based on the sensor information.

3. The marking apparatus of claim 1, further comprising a display device coupled to the processing device, wherein the processing device controls the display device to display the output information.

4. The marking apparatus of claim 3, wherein the processing device is configured to perform an analysis of the sensor information and to display selected information on the display device based on the analysis.

5. The marking apparatus of claim 1, further comprising a local memory coupled to the processing device, wherein the processing device controls the local memory to store the output information.

6. The marking apparatus of claim 5, wherein the processing device controls the local memory to record the sensor information in a table containing reference information.

7. The marking apparatus of claim 1, further comprising a communication system coupled to the processing device, wherein the processing device controls the communication system to transmit the output information to a remote device.

8. The marking apparatus of claim 7, wherein the processing device is configured to perform an analysis of the sensor information and to transmit a notification with the communication system based on the analysis.

9. The marking apparatus of claim 1, further comprising a light source, wherein the light source is used in combination with the optical sensor to provide the sensor information.

10. The marking apparatus of claim 1, further comprising a switch sensor, coupled to the processing device, to detect that the marking dispenser is empty or nearly empty.

11. The marking apparatus of claim 1, further comprising a weight sensor, coupled to the processing device, to detect a weight of the marking substance in the marking dispenser.

12. The marking apparatus of claim 11, wherein the processing device is configured to determine an amount of marking substance remaining in the marking dispenser based at least in part on the detected weight.

13. The marking apparatus of claim 11, wherein the processing device is configured to determine an estimated marking distance available from the marking dispenser based at least in part on the detected weight.

14. The marking apparatus of claim 1, wherein the processing device:
    makes a comparison of information relating to the sensor information and reference information; and
    controls dispensing of the marking substance based on the comparison.

15. The marking apparatus of claim 1, wherein the processing device is configured to determine an approved usage in response to the sensor information.

16. A marking apparatus to mark a presence or an absence of an underground facility in a dig area, the marking apparatus comprising:
    a housing;
    a marking dispenser holder affixed to the housing to hold at least one marking dispenser;
    an actuator, communicatively coupled to the marking dispenser, to cause dispensing of the marking substance from the marking dispenser onto ground in the dig area;
    an optical sensor, coupled to the housing and disposed proximate to the marking dispenser, to provide sensor information representative of a color of the marking substance;
    a local memory configured to store reference information;
    a processing device, coupled to the optical sensor and the local memory, to compare the sensor information to the reference information and to generate output information based on the comparison, the output information indicative of the color of the marking substance;
    a display device coupled to the processing device, wherein the processing device controls the display device to display the output information; and
    a communication system coupled to the processing device, wherein the processing device controls the communication system to transmit the output information to a remote device.

17. A method of detecting a color of a marking substance contained in a marking dispenser of a marking apparatus for marking a presence or an absence of an underground facility in a dig area by dispensing the marking substance on ground, wherein the marking apparatus comprises a housing, a processing device, a memory containing reference information, the marking dispenser affixed to the housing and containing the marking substance, an actuator communicatively coupled to the marking dispenser to cause the dispensing of the marking substance from the marking dispenser onto the ground in the dig area, and an optical sensor coupled to the housing, the method comprising:
    A) acquiring, via the optical sensor, sensor color information relating to the marking dispenser containing the marking substance;

B) comparing, via the processing device, the sensor information to color reference information stored in the memory;
C) determining, via the processing device, the color of the marking substance based at least in part on B); and
D) generating output information indicative of the color of the marking substance based at least in part on C).

18. The method of claim 17, wherein C) comprises determining, via the processing device, the color of the marking substance based at least in part on a match between the comparison in B) of the sensor color information and the reference color information.

19. The method of claim 18, further comprising:
E) inhibiting the dispensing of the marking substance in the absence of the match.

20. The method of claim 17, further comprising:
F) displaying the output information on a display device.

21. The method of claim 20, further comprising:
G) storing the output information into the local memory.

22. The method of claim 21, further comprising:
H) transmitting the output information to a remote device using a communication system.

23. The method of claim 17, further comprising:
I) operating in a learning mode, including acquiring, via the optical sensor, sensor color information relating a color of a known marking substance and recording the detected color into the memory containing color reference information.

* * * * *